(12) United States Patent
Abi Aoun

(10) Patent No.: US 12,478,096 B2
(45) Date of Patent: Nov. 25, 2025

(54) APPARATUS FOR HEATING SMOKABLE MATERIAL

(71) Applicant: NICOVENTURES TRADING LIMITED, London (GB)

(72) Inventor: Walid Abi Aoun, London (GB)

(73) Assignee: NICOVENTURES TRADING LIMITED, London (GB)

( * ) Notice: Subject to any disclaimer, the term of this patent is extended or adjusted under 35 U.S.C. 154(b) by 667 days.

(21) Appl. No.: 16/311,418

(22) PCT Filed: Jun. 27, 2017

(86) PCT No.: PCT/EP2017/065909
§ 371 (c)(1),
(2) Date: Dec. 19, 2018

(87) PCT Pub. No.: WO2018/002086
PCT Pub. Date: Jan. 4, 2018

(65) Prior Publication Data
US 2019/0230988 A1    Aug. 1, 2019

Related U.S. Application Data

(60) Provisional application No. 62/356,325, filed on Jun. 29, 2016.

(51) Int. Cl.
*A24F 1/32* (2006.01)
*A24B 15/167* (2020.01)
(Continued)

(52) U.S. Cl.
CPC .............. *A24F 1/32* (2013.01); *A24B 15/167* (2016.11); *A24D 1/20* (2020.01); *A24F 40/465* (2020.01); *H05B 6/105* (2013.01); *A24F 40/20* (2020.01)

(58) Field of Classification Search
CPC ........ A24F 40/20; A24F 40/465; A24F 40/10; A24F 40/30; A24F 40/42; A24D 1/20
See application file for complete search history.

(56) References Cited

U.S. PATENT DOCUMENTS 2,592,554 A    4/1952  Frankenburg
2,860,638 A    11/1958 Frank et al.
(Continued)

FOREIGN PATENT DOCUMENTS

AU    2014369867 A1    6/2016
AU    2017289114 B2    4/2020
(Continued)

OTHER PUBLICATIONS

Application and File History for U.S. Appl. No. 16/311,411, filed Dec. 19, 2018, inventorsAbi Aoun et al.
(Continued)

*Primary Examiner* — Alex B Efta
(74) *Attorney, Agent, or Firm* — Merchant & Gould P.C.

(57) ABSTRACT

Disclosed is an apparatus for heating smokable material to volatilize at least one component of the smokable material. The apparatus includes a magnetic field generator for generating a varying magnetic field; a body of heating material that is heatable by penetration with the varying magnetic field; a non-smokable thermally-conductive element in thermal contact with the body of heating material and arranged relative to the body of heating material so that heating of the heating material by penetration with the varying magnetic field causes progressive heating of the element; and a heating zone for receiving at least a portion of an article comprising smokable material. The heating zone is in thermal contact with the element and is arranged relative to the element so that the progressive heating causes progressive heating of the heating zone.

27 Claims, 3 Drawing Sheets

(51) Int. Cl.
 *A24D 1/20* (2020.01)
 *A24F 40/20* (2020.01)
 *A24F 40/465* (2020.01)
 *H05B 6/10* (2006.01)

(56) References Cited

U.S. PATENT DOCUMENTS

| | | | |
|---|---|---|---|
| 3,065,756 | A | 11/1962 | Noel et al. |
| 3,144,174 | A | 8/1964 | Henry et al. |
| 3,173,612 | A | 3/1965 | Gut et al. |
| 3,517,151 | A | 6/1970 | Mekjean et al. |
| 3,596,034 | A | 7/1971 | Mekjean |
| 4,149,548 | A | 4/1979 | Bradshaw |
| 4,913,168 | A | 4/1990 | Potter et al. |
| 4,944,317 | A | 7/1990 | Thal |
| 5,093,894 | A | 3/1992 | Deevi et al. |
| 5,144,962 | A | 9/1992 | Counts et al. |
| 5,317,132 | A | 5/1994 | Clough et al. |
| 5,369,249 | A | 11/1994 | Kwon |
| 5,613,505 | A | 3/1997 | Campbell et al. |
| 5,649,554 | A | 7/1997 | Sprinkel et al. |
| 6,053,176 | A | 4/2000 | Adams et al. |
| 6,632,407 | B1 | 10/2003 | Lau et al. |
| 6,803,550 | B2 | 10/2004 | Sharpe et al. |
| 7,185,659 | B2 | 3/2007 | Sharpe |
| 7,185,959 | B2 | 3/2007 | Mueller et al. |
| 7,810,505 | B2 | 10/2010 | Yang |
| 8,459,271 | B2 | 6/2013 | Inagaki |
| 8,807,140 | B1 * | 8/2014 | Scatterday ............... A24F 40/40 131/365 |
| 8,910,640 | B2 | 12/2014 | Sears et al. |
| 8,968,848 | B2 | 3/2015 | Quella et al. |
| 9,357,803 | B2 | 6/2016 | Egoyants et al. |
| 9,554,598 | B2 | 1/2017 | Egoyants et al. |
| 9,710,921 | B2 | 7/2017 | Wong et al. |
| 9,980,512 | B2 | 5/2018 | Collett et al. |
| 10,058,123 | B2 | 8/2018 | Taluskie et al. |
| 10,420,372 | B2 | 9/2019 | Suzuki et al. |
| 10,524,508 | B2 | 1/2020 | Sur et al. |
| 11,363,682 | B2 | 6/2022 | Mironov et al. |
| 11,956,879 | B2 | 4/2024 | Thorsen et al. |
| 2002/0005207 | A1 | 1/2002 | Wrenn et al. |
| 2002/0038799 | A1 | 4/2002 | Laken et al. |
| 2002/0038800 | A1 | 4/2002 | Laken et al. |
| 2002/0078951 | A1 | 6/2002 | Nichols et al. |
| 2002/0078956 | A1 | 6/2002 | Sharpe et al. |
| 2003/0007887 | A1 | 1/2003 | Roumpos et al. |
| 2003/0102304 | A1 | 6/2003 | Boyers |
| 2003/0230567 | A1 | 12/2003 | Centanni et al. |
| 2004/0149297 | A1 | 8/2004 | Sharpe |
| 2004/0149737 | A1 | 8/2004 | Sharpe et al. |
| 2004/0188418 | A1 | 9/2004 | Aisenbrey |
| 2005/0025213 | A1 | 2/2005 | Parks |
| 2005/0045193 | A1 | 3/2005 | Yang |
| 2007/0267409 | A1 | 11/2007 | Gard et al. |
| 2009/0120928 | A1 | 5/2009 | Lee et al. |
| 2009/0151717 | A1 | 6/2009 | Bowen et al. |
| 2009/0293888 | A1 | 12/2009 | Williams et al. |
| 2010/0024834 | A1 | 2/2010 | Oglesby et al. |
| 2010/0181387 | A1 | 7/2010 | Zaffaroni et al. |
| 2011/0240022 | A1 | 10/2011 | Hodges et al. |
| 2011/0271971 | A1 | 11/2011 | Conner et al. |
| 2012/0145703 | A1 | 6/2012 | Matsen et al. |
| 2012/0214926 | A1 | 8/2012 | Berthold et al. |
| 2012/0234315 | A1 | 9/2012 | Li et al. |
| 2012/0305545 | A1 | 12/2012 | Brosnan et al. |
| 2013/0030125 | A1 | 1/2013 | Buryak et al. |
| 2013/0133675 | A1 | 5/2013 | Shinozaki et al. |
| 2013/0160780 | A1 | 6/2013 | Matsumoto et al. |
| 2014/0060554 | A1 | 3/2014 | Collett et al. |
| 2014/0096782 | A1 | 4/2014 | Ampolini et al. |
| 2014/0158144 | A1 | 6/2014 | Kaljura et al. |
| 2014/0216485 | A1 | 8/2014 | Egoyants et al. |
| 2014/0224267 | A1 | 8/2014 | Levitz et al. |
| 2014/0301721 | A1 | 10/2014 | Ruscio |
| 2014/0305449 | A1 * | 10/2014 | Plojoux .................. A24F 40/46 131/328 |
| 2014/0338686 | A1 | 11/2014 | Plojoux et al. |
| 2014/0373856 | A1 | 12/2014 | Zuber et al. |
| 2015/0040925 | A1 | 2/2015 | Saleem et al. |
| 2015/0043123 | A1 | 2/2015 | Cox |
| 2015/0181937 | A1 | 7/2015 | Dubief et al. |
| 2015/0201670 | A1 | 7/2015 | Crooks et al. |
| 2015/0201675 | A1 | 7/2015 | Lord |
| 2015/0237913 | A1 | 8/2015 | Suzuki et al. |
| 2015/0245669 | A1 | 9/2015 | Cadieux |
| 2015/0260047 | A1 | 9/2015 | Gieras et al. |
| 2015/0272219 | A1 | 10/2015 | Hatrick et al. |
| 2015/0335062 | A1 | 11/2015 | Shinkawa et al. |
| 2016/0007652 | A1 | 1/2016 | Taluskie et al. |
| 2016/0012022 | A1 | 1/2016 | Lim |
| 2016/0120221 | A1 * | 5/2016 | Mironov ................. A24F 40/42 392/395 |
| 2016/0150825 | A1 | 6/2016 | Mironov et al. |
| 2016/0192708 | A1 | 7/2016 | DeMeritt et al. |
| 2016/0324215 | A1 | 11/2016 | Mironov et al. |
| 2016/0331031 | A1 | 11/2016 | Malgat et al. |
| 2017/0055574 | A1 | 3/2017 | Kaufman et al. |
| 2017/0055575 | A1 | 3/2017 | Wilke et al. |
| 2017/0055580 | A1 | 3/2017 | Blandino et al. |
| 2017/0055581 | A1 | 3/2017 | Wilke et al. |
| 2017/0055582 | A1 | 3/2017 | Blandino et al. |
| 2017/0055583 | A1 | 3/2017 | Blandino et al. |
| 2017/0055584 | A1 | 3/2017 | Blandino et al. |
| 2017/0055585 | A1 * | 3/2017 | Fursa .................... A24F 40/53 |
| 2017/0071250 | A1 | 3/2017 | Mironov et al. |
| 2017/0095006 | A1 | 4/2017 | Egoyants et al. |
| 2017/0119046 | A1 | 5/2017 | Kaufman et al. |
| 2017/0119047 | A1 | 5/2017 | Blandino et al. |
| 2017/0119048 | A1 | 5/2017 | Kaufman et al. |
| 2017/0119049 | A1 | 5/2017 | Blandino et al. |
| 2017/0119050 | A1 | 5/2017 | Blandino et al. |
| 2017/0119051 | A1 | 5/2017 | Blandino et al. |
| 2017/0156403 | A1 | 6/2017 | Gill et al. |
| 2017/0174418 | A1 | 6/2017 | Cai |
| 2017/0199048 | A1 | 7/2017 | Igumnov et al. |
| 2017/0224015 | A1 | 8/2017 | Basil et al. |
| 2017/0251718 | A1 | 9/2017 | Armoush et al. |
| 2017/0325506 | A1 | 11/2017 | Batista |
| 2018/0228217 | A1 * | 8/2018 | Mironov ................. A24F 40/42 |
| 2018/0235279 | A1 | 8/2018 | Wilke et al. |
| 2018/0242633 | A1 | 8/2018 | Wilke et al. |
| 2018/0242636 | A1 | 8/2018 | Blandino et al. |
| 2018/0279677 | A1 | 10/2018 | Blandino et al. |
| 2018/0317552 | A1 | 11/2018 | Kaufman et al. |
| 2018/0317553 | A1 | 11/2018 | Blandino et al. |
| 2018/0317555 | A1 | 11/2018 | Blandino et al. |
| 2018/0325173 | A1 | 11/2018 | Blandino et al. |
| 2018/0360123 | A1 * | 12/2018 | Silvestrini ............... A24F 7/02 |
| 2019/0159517 | A1 | 5/2019 | Ballesteros Gomez et al. |
| 2019/0191780 | A1 | 6/2019 | Wilke et al. |
| 2019/0239555 | A1 | 8/2019 | Nicholson |
| 2020/0054068 | A1 | 2/2020 | Blandino et al. |
| 2020/0054069 | A1 | 2/2020 | Blandino et al. |
| 2020/0229497 | A1 | 7/2020 | Aoun et al. |
| 2020/0268053 | A1 | 8/2020 | Thorsen et al. |
| 2020/0288774 | A1 | 9/2020 | Blandino et al. |
| 2021/0100281 | A1 | 4/2021 | Abi Aoun et al. |
| 2022/0015408 | A1 | 1/2022 | Blandino et al. |

FOREIGN PATENT DOCUMENTS

| | | | |
|---|---|---|---|
| CA | 2003521 | A1 | 5/1990 |
| CA | 2003522 | A1 | 5/1990 |
| CA | 2937722 | A1 | 11/2015 |
| CA | 2974770 | A1 | 12/2015 |
| CA | 2982164 | A1 | 10/2016 |
| CA | 3002424 | A1 | 4/2017 |
| CN | 1126426 | A | 7/1996 |
| CN | 2393205 | Y | 8/2000 |
| CN | 2738167 | Y | 11/2005 |
| CN | 2924411 | Y | 7/2007 |
| CN | 101084801 | A | 12/2007 |
| CN | 201076006 | Y | 6/2008 |

(56) References Cited

FOREIGN PATENT DOCUMENTS

| | | |
|---|---|---|
| CN | 201088138 Y | 7/2008 |
| CN | 101277623 A | 10/2008 |
| CN | 101326138 A | 12/2008 |
| CN | 101390659 A | 3/2009 |
| CN | 201199922 Y | 3/2009 |
| CN | 101951796 A | 1/2011 |
| CN | 201762288 U | 3/2011 |
| CN | 101326138 B | 1/2013 |
| CN | 103202540 A | 7/2013 |
| CN | 203369386 U | 1/2014 |
| CN | 203435685 U | 2/2014 |
| CN | 103689812 A | 4/2014 |
| CN | 203735483 U | 7/2014 |
| CN | 103988576 A | 8/2014 |
| CN | 203748687 U | 8/2014 |
| CN | 203762288 U | 8/2014 |
| CN | 104013109 A | 9/2014 |
| CN | 104095291 A | 10/2014 |
| CN | 104256899 A | 1/2015 |
| CN | 204091003 U | 1/2015 |
| CN | 204120237 U | 1/2015 |
| CN | 104365175 A | 2/2015 |
| CN | 104470387 A | 3/2015 |
| CN | 104480800 A | 4/2015 |
| CN | 104619202 A | 5/2015 |
| CN | 104664608 A | 6/2015 |
| CN | 104768407 A | 7/2015 |
| CN | 204519366 U | 8/2015 |
| CN | 204539505 U | 8/2015 |
| CN | 204599333 U | 9/2015 |
| CN | 104994757 A | 10/2015 |
| CN | 105188425 A | 12/2015 |
| CN | 105682488 A | 6/2016 |
| CN | 104095291 B | 1/2017 |
| EA | 009116 B1 | 10/2007 |
| EP | 0430559 A2 | 6/1991 |
| EP | 0430566 A2 | 6/1991 |
| EP | 0488488 A1 | 6/1992 |
| EP | 0703735 A1 | 4/1996 |
| EP | 0703735 B1 | 7/2001 |
| EP | 1357025 A2 | 10/2003 |
| EP | 1454840 A1 | 9/2004 |
| EP | 1454840 B1 | 9/2006 |
| EP | 1940254 A2 | 7/2008 |
| EP | 2059091 A2 | 5/2009 |
| EP | 1357025 B1 | 7/2009 |
| EP | 2186833 A1 | 5/2010 |
| EP | 2316286 A1 | 5/2011 |
| EP | 2327318 A1 | 6/2011 |
| EP | 2444112 A1 | 4/2012 |
| EP | 2253541 B1 | 5/2012 |
| EP | 2460424 | 6/2012 |
| EP | 2903552 A1 | 8/2015 |
| EP | 2907397 A1 | 8/2015 |
| EP | 3367823 A2 | 9/2018 |
| EP | 3542747 A1 | 9/2019 |
| EP | 3632244 A1 | 4/2020 |
| GB | 347650 A | 4/1931 |
| GB | 2495923 A | 5/2013 |
| GB | 2504732 A | 2/2014 |
| GB | 2504733 A | 2/2014 |
| GB | 2515992 A | 1/2015 |
| JP | S457120 Y1 | 4/1970 |
| JP | H03113366 A | 5/1991 |
| JP | H0556298 U | 7/1993 |
| JP | H07502188 A | 3/1995 |
| JP | H0850422 A | 2/1996 |
| JP | H0851175 A | 2/1996 |
| JP | H08511175 A | 11/1996 |
| JP | H09509845 A | 10/1997 |
| JP | 2001174054 A | 6/2001 |
| JP | 2002043047 A | 2/2002 |
| JP | 2002144451 A | 5/2002 |
| JP | 2002252078 A | 9/2002 |
| JP | 2004121594 A | 4/2004 |
| JP | 3588469 B2 | 11/2004 |
| JP | 2004331191 A | 11/2004 |
| JP | 2008050422 A | 3/2008 |
| JP | 2008511175 A | 4/2008 |
| JP | 2009087703 A | 4/2009 |
| JP | 2010022754 A | 2/2010 |
| JP | 2010050834 A | 3/2010 |
| JP | 2010508034 A | 3/2010 |
| JP | WO2010113702 A1 | 10/2012 |
| JP | 2013013441 A | 1/2013 |
| JP | 2013515465 A | 5/2013 |
| JP | 2015524261 A | 8/2015 |
| JP | 2015531601 A | 11/2015 |
| JP | 2016508744 A | 3/2016 |
| JP | 2016516402 A | 6/2016 |
| JP | 2016538842 A | 12/2016 |
| JP | 6077145 B2 | 2/2017 |
| JP | 2017515490 A | 6/2017 |
| JP | 2017526381 A | 9/2017 |
| JP | 2020512487 A | 4/2020 |
| JP | 2021505125 A | 2/2021 |
| JP | 6875044 B2 | 5/2021 |
| JP | 6933323 B2 | 9/2021 |
| JP | 7105289 B2 | 7/2022 |
| KR | 880701636 A | 11/1988 |
| KR | 100385395 B1 | 8/2003 |
| KR | 100449444 B1 | 8/2005 |
| KR | 20100108565 A | 10/2010 |
| KR | 20130029697 A | 3/2013 |
| KR | 20140093659 A | 7/2014 |
| KR | 20150027069 A | 3/2015 |
| KR | 20150040012 A | 4/2015 |
| KR | 20150047616 A | 5/2015 |
| KR | 20150132112 A | 11/2015 |
| KR | 20150143877 A | 12/2015 |
| KR | 20160064159 A | 6/2016 |
| KR | 20170008209 A | 1/2017 |
| RU | 2132629 C1 | 7/1999 |
| RU | 2135054 C1 | 8/1999 |
| RU | 103281 U1 | 4/2011 |
| RU | 2425608 C2 | 8/2011 |
| RU | 2509516 C2 | 3/2014 |
| RU | 2517125 C2 | 5/2014 |
| RU | 2531890 C2 | 10/2014 |
| RU | 2015106592 A | 11/2016 |
| RU | 2682772 C1 | 3/2019 |
| UA | 125609 C2 | 5/2022 |
| WO | WO-8404698 A1 | 12/1984 |
| WO | WO-9409842 A1 | 5/1994 |
| WO | WO 9527411 | 10/1995 |
| WO | WO-9527412 A1 | 10/1995 |
| WO | WO-9618662 A1 | 6/1996 |
| WO | WO-02089532 A1 | 11/2002 |
| WO | WO-02098389 A1 | 12/2002 |
| WO | WO-2007051163 A2 | 5/2007 |
| WO | WO-2008015441 A1 | 2/2008 |
| WO | WO-2009079641 A2 | 6/2009 |
| WO | WO-2010133342 A1 | 11/2010 |
| WO | WO-2011130414 A1 | 10/2011 |
| WO | WO-2012134117 A2 | 10/2012 |
| WO | WO-2012164009 A2 | 12/2012 |
| WO | WO-2013034459 A1 | 3/2013 |
| WO | WO-2013098395 A1 | 7/2013 |
| WO | WO-2013098409 A1 | 7/2013 |
| WO | WO-2013131763 A1 | 9/2013 |
| WO | WO-2013131764 A1 | 9/2013 |
| WO | WO-2013144324 A1 | 10/2013 |
| WO | WO-2013178766 A1 | 12/2013 |
| WO | WO-2014023965 A1 | 2/2014 |
| WO | WO-2014023967 A1 | 2/2014 |
| WO | WO-2014048745 A1 | 4/2014 |
| WO | WO-2014054035 A1 | 4/2014 |
| WO | WO-2014061477 A1 | 4/2014 |
| WO | WO-2014102092 A1 | 7/2014 |
| WO | WO-2014104078 A1 | 7/2014 |
| WO | WO-2014139611 A1 | 9/2014 |
| WO | WO-2014140320 A1 | 9/2014 |
| WO | WO-2015019101 A1 | 2/2015 |
| WO | WO-2015062983 A2 | 5/2015 |

(56) References Cited

FOREIGN PATENT DOCUMENTS

| WO | WO-2015071682 A1 | 5/2015 |
|---|---|---|
| WO | WO-2015082648 A1 | 6/2015 |
| WO | WO-2015082649 A1 | 6/2015 |
| WO | WO-2015082651 A1 | 6/2015 |
| WO | WO-2015082652 A1 | 6/2015 |
| WO | WO-2015082653 A1 | 6/2015 |
| WO | WO-2015100361 A1 | 7/2015 |
| WO | WO-2015101479 A1 | 7/2015 |
| WO | 2015117701 A1 | 8/2015 |
| WO | WO-2015116934 A1 | 8/2015 |
| WO | WO-2015117702 A1 | 8/2015 |
| WO | WO 2015131058 | 9/2015 |
| WO | WO-2015155289 A1 | 10/2015 |
| WO | WO-2015166245 A2 | 11/2015 |
| WO | WO 2015175568 | 11/2015 |
| WO | WO 2015176898 | 11/2015 |
| WO | WO-2015177043 A1 | 11/2015 |
| WO | WO-2015177044 A1 | 11/2015 |
| WO | WO-2015177045 A1 | 11/2015 |
| WO | WO-2015177247 A1 | 11/2015 |
| WO | WO 2015177253 | 11/2015 |
| WO | WO 2015177255 | 11/2015 |
| WO | WO 2015177257 | 11/2015 |
| WO | WO-2015177264 A1 | 11/2015 |
| WO | WO-2015177294 A1 | 11/2015 |
| WO | 2015197863 A1 | 12/2015 |
| WO | WO-2015198015 A1 | 12/2015 |
| WO | WO-2016023965 A1 | 2/2016 |
| WO | WO-2016075426 A1 | 5/2016 |
| WO | WO-2016075436 A1 | 5/2016 |
| WO | 2016088037 A1 | 6/2016 |
| WO | WO 2016096865 | 6/2016 |
| WO | WO-2016162446 A1 | 10/2016 |
| WO | WO 2015177046 | 11/2016 |
| WO | WO-2016207407 A1 | 12/2016 |
| WO | WO-2017005705 A1 | 1/2017 |
| WO | WO 2017029269 | 2/2017 |
| WO | WO-2017036950 A2 | 3/2017 |
| WO | WO-2017036951 A1 | 3/2017 |
| WO | WO 2017036954 | 3/2017 |
| WO | WO-2017036955 A2 | 3/2017 |
| WO | WO-2017036957 A1 | 3/2017 |
| WO | WO-2017036958 A2 | 3/2017 |
| WO | WO-2017036959 A1 | 3/2017 |
| WO | WO-2017036958 A3 | 4/2017 |
| WO | WO-2017068098 A1 | 4/2017 |
| WO | 2017072149 A1 | 5/2017 |
| WO | WO-2017072145 A1 | 5/2017 |
| WO | WO-2017072146 A1 | 5/2017 |
| WO | WO-2017072147 A2 | 5/2017 |
| WO | WO-2017072148 A1 | 5/2017 |
| WO | WO-2017072147 A3 | 7/2017 |
| WO | WO-2017167932 A1 | 10/2017 |
| WO | 2018002085 A1 | 1/2018 |

OTHER PUBLICATIONS

Application and File History for U.S. Appl. No. 15/772,391, filed Apr. 30, 2018, inventor Duane A Kaufman.
Application and File History for U.S. Appl. No. 15/772,399, filed Apr. 30, 2018, inventor Thomas P. Blandino.
Application and File History for U.S. Appl. No. 15/772,394, filed Apr. 30, 2018, inventors Blandino et al.
Application and File History for U.S. Appl. No. 16/311,405, filed Dec. 19, 2018, inventors Abi Aoun et al.
Examination Report for Australian Application No. 2016313708, mailed on Nov. 1, 2019, 7 pages.
Examination Report for Australian Application No. 2016313708, mailed on Nov. 23, 2018, 6 pages.
Examination Report mailed Sep. 6, 2019 for Australian Application No. 2017289114, 7 pages.
Examination Report No. 1 for Australian Patent Application No. 2018334042 dated Dec. 16, 2020, 4 pages.
Extended European Search Report for Application No. 20202666.2, mailed on Feb. 19, 2021, 14 pages.
Extended European Search Report for Application No. 20205060.5, mailed on Mar. 2, 2021, 19 pages.
Extended European Search Report for Application No. EP20205306.2, mailed on Feb. 19, 2021, 12 pages.
First Office Action and Search Report dated Mar. 4, 2020 for Chinese Application No. 201680077608.1 filed Oct. 26, 2016, 18 pages.
International Preliminary Report on Patentability for Application No. PCT/EP2016/075735, mailed on Jan. 2, 2018, 8 pages.
International Preliminary Report on Patentability for Application No. PCT/EP2016/075737, mailed on May 11, 2018, 10 pages.
International Preliminary Report on Patentability for Application No. PCT/EP2016/075738, mailed on May 11, 2018, 9 pages.
International Preliminary Report on Patentability for Application No. PCT/EP2017/065906, mailed on Jan. 10, 2019, 9 pages.
International Preliminary Report on Patentability for Application No. PCT/EP2017/065908, mailed on Jan. 10, 2019, 9 pages.
International Preliminary Report on Patentability for Application No. PCT/EP2018/075093, mailed on Mar. 26, 2020, 8 pages.
International Preliminary Report on Patentability for Application No. PCT/EP2017/065909,mailed on Jan. 10, 2019, 7 pages.
International Search Report and Written Opinion for Application No. PCT/EP2016/070190, mailed on Mar. 13, 2017, 19 pages.
International Search Report and Written Opinion for Application No. PCT/EP2016/075735, mailed on Feb. 2, 2017, 10 pages.
International Search Report and Written Opinion for Application No. PCT/EP2016/075736, mailed on Feb. 14, 2017, 6 pages.
International Search Report and Written Opinion for Application No. PCT/EP2016/075737, mailed on Jun. 16, 2017, 14 pages.
International Search Report and Written Opinion for Application No. PCT/EP2016/075738, mailed on Mar. 2, 2017, 12 pages.
International Search Report and Written Opinion for Application No. PCT/EP2017/065906, mailed on Oct. 24, 2017, 16 pages.
International Search Report and Written Opinion for Application No. PCT/EP2017/065908, mailed on Oct. 17, 2017, 11 pages.
International Search Report and Written Opinion for Application No. PCT/EP2018/075093, mailed on Jan. 4, 2019, 11 pages.
Iorga A., et al., "Low Curie Temperature in Fe—Cr—Ni—Mn Alloys," U.P.B. Sci.Bull., Series B, vol. 73 (4), 2011, pp. 195-202.
NeoMax Materials Co., Ltd., "NeoMax MS-135," retrieved from http://www.neomax-materials.co.jp/eng/pr0510.htm, as accessed on Oct. 30, 2015, 2 pages.
Notice of Reasons For Refusal Office Action mailed Sep. 8, 2020 for Japanese Application No. 2018-567856, 8 pages.
Notice of Reasons For Rejection Office Action mailed Mar. 17, 2020 for Japanese Application No. 2018-522061, 7 pages.
Office Action and Search Report mailed Apr. 14, 2020 for Chinese Application No. 201680063711.0, 28 pages.
Office Action dated Jun. 25, 2019 for Japanese Application No. 2018-521546, 4 pages.
Office Action for Chinese Application No. 201780039879.2 mailed on Sep. 18, 2020, 7 pages.
Office Action mailed Mar. 1, 2019 for Canadian Application No. 2996341, 4 pages.
Office Action mailed Sep. 9, 2020 for Chinese Application No. 201780040874.1, 20 pages.
Office Action mailed Dec. 11, 2019 for Brazilian Application No. BR112018008513 8, 6 pages.
Office Action mailed Sep. 15, 2020 for Japanese Application No. 2018-567854, 8 pages.
Office Action mailed Feb. 16, 2021 for Japanese Application No. 2018-567856, 2 pages.
Office Action mailed Aug. 19, 2020 for KR Application No. 20187037693, filed Jun. 27, 2017, 21 pages.
Office Action mailed Mar. 2, 2021 for Japanese Application No. 2018-567947, 4 pages.
Office Action mailed Mar. 22, 2019 for Korean Application No. 10-2018-7012422, 19 pages.
Office Action mailed Mar. 22, 2019 for Korean Application No. 10-2018-7012428, 22 pages.

(56) References Cited

OTHER PUBLICATIONS

Office Action mailed Jul. 23, 2019 for Japanese Application No. 2018-521928, 14 pages.
Office Action mailed Jul. 23, 2019 for Japanese Application No. 2018-522061, 9 pages.
Office Action mailed Feb. 25, 2020 for Japanese Application No. 2018-567854, 7 pages.
Office Action mailed Feb. 25, 2020 for Japanese Application No. 2018-567947, 6 pages.
Office Action mailed Feb. 25, 2020 for Japanese Appliication No. 2018-567856, 6 pages.
Office Action mailed Jun. 25, 2019 for Japanese Application No. 2018-519932, 5 pages.
Office Action mailed Sep. 26, 2019 for Korean Application No. 10-2018-7012353, 15 pages.
Office Action mailed Dec. 27, 2019 for Chinese Application No. 201680049091, 25 pages.
Office Action mailed Mar. 28, 2019 for Canadian Application No. 3003520, , 3 pages.
Office Action mailed Mar. 29, 2019 for Korean Application No. 10-2018-7012366, 6 pages.
Office Action mailed Oct. 29, 2018 for Russian Application No. 2018115542, 9 pages.
Office Action mailed Feb. 4, 2020 for Japanese Application No. 2018-507621, 29 pages.
Office Action mailed Feb. 7, 2019 for Korean Application No. 10-2018- 7006076, 10 pages.
Office Action mailed May 7, 2019 for Japanese Application No. 2018-507621, 8 pages.
Office Action mailed Dec. 9, 2019 for Canadian Application No. 3003521, 6 pages.
Todaka T., et al., "Low Curie Temperature Material for Induction Heating Self-Temperature Controlling System," Journal of Magnetism and Magnetic Materials, vol. 320 (20), Oct. 2008, pp. e702-e707.
International Search Report and Written Opinion, Application No. PCT/EP2017/065909, mailed Oct. 24, 2017, 14 pages.
Application and File History for U.S. Appl. No. 16/311,418, filed Dec. 19, 2018, inventors Abi Aoun et al.
Application and File History for U.S. Appl. No. 14/840,897, filed Aug. 31, 2015, inventors Kaufman et al.
Application and File History for U.S. Appl. No. 16/946,043, filed Jun. 3, 2020, inventors Blandino et al.
Application and File History for U.S. Appl. No. 14/927,529, filed Oct. 30, 2015, inventors Kaufman et al.
Application and File History for U.S. Appl. No. 14/927,532, filed Oct. 30, 2015, inventors Blandino et al.
Application and File History for U.S. Appl. No. 14/927,537, filed Oct. 30, 2015, inventors Kaufman et al.
Application and File History for U.S. Appl. No. 14/927,539, filed Oct. 30, 2015, inventors Blandino et al.
Application and File History for U.S. Appl. No. 14/927,551, filed Oct. 30, 2015, inventors Blandino et al.
Application and File History for U.S. Appl. No. 14/927,556, filed Oct. 30, 2015, inventors Blandino et al.
Application and File History for U.S. Appl. No. 15/754,834, filed Feb. 23, 2018, inventor Thomas P. Blandino.
Application and File History for U.S. Appl. No. 15/772,396, filed Apr. 30, 2018, inventor Thomas P. Blandino.
Application and File History for U.S. Appl. No. 15/733,194, filed Jun. 8, 2020, inventors Abi Aoun et al.
Application and File History for U.S. Appl. No. 16/647,325, filed Mar. 13, 2020, inventors Thorsen et al.
Communication pursuant to Article 94(3) EPC for Application No. 16798648.8, mailed on Nov. 19, 2020, 9 pages.
Communication pursuant to Article 94(3) EPC for Application No. 16798649.6, mailed on Jul. 5, 2021, 7 pages.
English Translation of Chinese Office Action, Application No. 2016800490915, mailed Aug. 14, 2020, 8 pages.
European Search Report for European Application No. 20205063.9, mailed on Feb. 18, 2021. 13 pages.
Extended European Search Report for Application No. 20204770.0, mailed on Jun. 30, 2021, 14 pages.
Extended European Search Report for Application No. 20205060.5, mailed on Aug. 6, 2021, 20 pages.
Extended European Search Report for Application No. 20205065.4, mailed on Mar. 10, 2021, 14 pages.
International Preliminary Report on Patentability for Application No. PCT/EP2016/070190, mailed on Mar. 15, 2018, 12 pages.
International Preliminary Report on Patentability for Application No. PCT/EP2016/075736, mailed on May 11, 2018, 6 pages.
International Search Report and Written Opinion for Application No. PCT/EP2018/058195, mailed on Nov. 12, 2018, 20 pages.
International Search Report for Application No. PCT/EP2018/083795, mailed Mar. 15, 2019, 3 pages.
Notice of Opposition mailed Jun. 3, 2020 for European Application No. 16766494.5, 37 pages.
Notice of Reasons for Refusal For Japanese Application No. 2020-528003, mailed on Jul. 20, 2021, 3 pages.
Office Action dated Jun. 1, 2021, for Russian Application No. 2020135859, 12 pages.
Office Action dated Jun. 17, 2021 for Ukraine Application No. 201804590, 3 pages.
Office Action For Canadian Application No. 3,003,519, mailed on Jul. 30, 2021, 4 pages.
Office Action For Canadian Application No. 3,056,677, mailed on Nov. 24, 2020, 6 pages.
Office Action For Chinese Application No. 201680072882.X, mailed on Jan. 14, 2021, 12 pages.
Office Action For Chinese Application No. 201780040300.4, mailed on Nov. 15, 2021, 14 pages.
Office Action For Japanese Application No. 2020-093539, mailed on Apr. 6, 2021, 6 pages.
Office Action For Japanese Application No. 2020-175420, mailed on Oct. 12, 2021, 9 pages.
Office Action For Japanese Application No. 2020-182740, mailed on Oct. 12, 2021, 10 pages.
Office Action For Japanese Application No. 2020-182750, mailed on Oct. 12, 2021, 8 pages.
Office Action For Japanese Application No. 2020-183062, mailed on Nov. 30, 2021, 6 pages.
Office Action For Korean Application No. 10-2018-7037677, dated May 12, 2021, 4 pages.
Office Action For Korean Application No. 10-2018-7037677, mailed on Mar. 29, 2021, 6 pages.
Office Action For Korean Application No. 10-2021-7018056, mailed on Oct. 27, 2021, 21 pages.
Office Action For Korean Application No. 10-2021-7023346, mailed on Dec. 14, 2021, 40 pages.
Office Action for Malaysian Application No. PI2018002742, dated Apr. 21, 2021, 4 pages.
Office Action For Russian Application No. 2020135808, mailed on Apr. 23, 2021, 12 pages.
Office Action For Russian Application No. 2020135851, mailed on May 24, 2021, 13 pages.
Office Action mailed May 12, 2021 for Chinese Application No. 201780040874.1, 15 pages.
Office Action mailed May 12, 2021 for Korean Application No. 10-2018-7037693, 7 pages.
Office Action mailed Apr. 29, 2021, for Malaysian Application No. PI2018701525, 3 pages.
Notification of Reason for Refusal mailed Jan. 3, 2022 for Korean Application No. 10-2020-7018918, 12 pages.
Office Action and Search Report for Chinese Application No. 201880059756, mailed Jan. 14, 2022, 11 pages.
Office Action and Search Report for Russian Application No. 2020134245, mailed on Jan. 19, 2022, 27 pages.
Office Action and Search Report mailed Jan. 18, 2022 for Russian Application No. 2020134241, 22 pages.
Office Action for Brazilian Application No. 112018077348-4, mailed on Sep. 27, 2021, 4 pages.

(56) References Cited

OTHER PUBLICATIONS

Communication pursuant to Article 94(3) EPC for Application No. 17740628.7 mailed on May 9, 2022, 9 pages.
Communication pursuant to Article 94(3) EPC for Application No. 21213373.0 mailed on May 9, 2022, 6 pages.
Decision to Grant a Patent mailed Mar. 15, 2022 for Japanese Application No. 2020-183062, 5 pages.
European Search Report for Application No. 21213373.0, mailed on Apr. 26, 2022, 7 pages.
Office Action For Chinese Application No. 201680072882. X, mailed on Sep. 1, 2021, 17 pages.
Office Action for Chinese Application No. 201780040300.4, mailed on Apr. 26, 2022, 9 pages.
Office Action For Japanese Application No. 2020-191836, mailed on Oct. 26, 2021, 8 pages.
Office Action For Japanese Application No. 2020-191838, mailed on Oct. 26, 2021, 8 pages.
Office Action for Japanese Application No. 2022-010005, mailed on Mar. 15, 2022, 3 pages.
Office Action for Korean Application No. 10-2020-7011369, mailed May 10, 2022, 18 pages.
Office Action for Ukraine Application No. a201813017, mailed May 6, 2022, 3 pages.
Office Action mailed Jun. 22, 2022 for Russian Application No. 2019107295, 8 pages.
Office Action received for Brazilian Patent Application No. 112018077348-4, mailed on Oct. 25, 2022, 1 page (Official Copy Only).
Office Action received for Brazilian Patent Application No. 112018077348-4, mailed on Sep. 2, 2022, 5 pages (Official Copy Only).
Notice of Reasons of Refusal received for Japanese Patent Application No. 2020-191838, mailed on Jul. 5, 2022, 6 bages (3 pages of English Translation and 3 pages of Official Copy).
Kaufman et al., Application and File History for U.S. Appl. No. 16/947,215, filed Jul. 23, 2020.
Communication pursuant to Article 94(3) EPC for Application No. 17740631.1 mailed on Oct. 18, 2022, 6 pages.
Office action for Brazilian Application No. 112020005010-5, mailed on Jul. 21, 2022, 4 pages.
Office Action for Chinese Application No. 201880059756.X, mailed Sep. 23, 2022, 6 pages.
Office action for Korean Application No. 10-2020-7007392, mailed Sep. 26, 2022, 15 Pages.
Office action for Korean Application No. 10-2020-7018918, mailed on Jul. 27, 2022, 6 pages.
"International Preliminary Report on Patentability received for PCT Patent Application No. PCT/EP2021/075735, mailed on Apr. 13, 2023", 11 pages.
"International Search Report and Written Opinion received for PCT Patent Application No. PCT/EP2021/075735, mailed on Jan. 5, 2022", 17 pages.
"Notice of Reasons for Refusal received for Japanese Patent Application No. 2022-048457, mailed on Jan. 31, 2023", 15 pages (8 pages of English Translation and 7 pages of Official Copy).
"Office Action received for Australian Patent Application No. 2022200981, mailed on Dec. 15, 2022", 3 pages.
"Office Action received for European Patent Application No. 16798649.6, mailed on Jan. 3, 2022", 7 pages.
"Office Action received for European Patent Application No. 16798649.6, mailed on May 25. 2022", 5 pages.
"Office Action received for European Patent Application No. 16798650.4, mailed on Mar. 6, 2020", 4 pages.
"Office Action received for Korean Patent Application No. 10-2022-7025860, mailed on Feb. 15, 2023", 18 pages (10 pages of English Translation and 8 pages of Official Copy).
"Result of Consultation received for European Patent Application No. 16798650.4, mailed on Feb. 8, 2022", 4 pages.
"Decision of Refusal received for Japanese Patent Application No. 2020-191838, mailed on Feb. 28, 2023", 6 pages (3 pages of English Translation and 3 pages of Official Copy).
"Extended Search Report received for European Patent Application No. 22166210.9, mailed on Oct. 31, 2022", 11 pages.
"International Preliminary Report on Patentability received for PCT Patent Application No. PCT/EP2018/083795, mailed on Jun. 18, 2020", 8 pages.
"Notice of Reason for Refusal received for Japanese Patent Application No. 2022-160803, mailed on Nov. 14, 2023", 7 pages (3 pages of English Translation and 4 pages of Official Copy).
"Notice of Reasons for Refusal received for Japanese Patent Application No. 2022-011143, mailed on Mar. 28, 2023", 12 pages (6 pages of English Translation and 6 pages of Official Copy).
"Notice of Reasons for Rejection for Japanese Application No. 2022-139703, mailed on Jul. 25, 2023", 6 pages. (3 pages of English Translation and 3 pages of Official Copy).
"Office Action received for Brazilian Patent Application No. 122022011678-7, mailed on Feb. 27, 2023", 10 pages (Official Copy Only).
"Office Action received for Canadian Patent Application No. 3,171,963, mailed on Nov. 22, 2023", 7 pages.
"Office Action received for European Patent Application No. 20202666.2, mailed on Jul. 6, 2023", 8 pages.
"Office Action received for European Patent Application No. 20205060.5, mailed on Jul. 28, 2023", 8 pages.
"Office Action received for Korean Patent Application No. 10-2020-7018748, mailed on Jun. 28, 2023", 14 pages (8 pages of English Translation and 6 pages of Official Copy).
"Reason for Rejection received for Korean Patent Application No. 10-2022-7025860, mailed on Aug. 11, 2023", 21 pages (12 pages of English Translation and 9 pages of Official Copy).
"Reasons for Refusal received for Japanese Patent Application No. 2022-111113, mailed on Aug. 29, 2023", 6 pages (3 pages of English Translation and 3 pages of Official Copy).
"Reasons for Rejection received for Korean Patent Application No. 10-2021-7016788, mailed on Dec. 1, 2023", 12 pages (6 pages of English Translation and 6 pages of Official Copy).
"Reasons for Refusal received for Japanese Patent Application No. 2023-180954, mailed on Dec. 17, 2024", 5 pages (English Translation only).
"Reasons for Rejection received for Korean Patent Application No. 10-2023-7040002, mailed on Oct. 8, 2024", 6 pages (2 pages of English Translation and 4 pages of Official Copy).

\* cited by examiner

APPARATUS FOR HEATING SMOKABLE MATERIAL

PRIORITY CLAIM

The present application is a National Phase entry of PCT Application No. PCT/EP2017/065909, filed Jun. 27, 2017, which claims priority from U.S. Provisional Application No. 62/356,325, filed Jun. 29, 2016, each of which is hereby fully incorporated herein by reference.

TECHNICAL FIELD

The present disclosure relates to an apparatus for heating smokable material to volatilize at least one component of the smokable material, to articles for use with such an apparatus, to systems comprising such an apparatus and such articles, and to methods of heating smokable material to volatilize at least one component of the smokable material.

BACKGROUND

Smoking articles such as cigarettes, cigars and the like burn tobacco during use to create tobacco smoke. Attempts have been made to provide alternatives to these articles by creating products that release compounds without combusting. Examples of such products are so-called "heat not burn" products or tobacco heating devices or products, which release compounds by heating, but not burning, material. The material may be, for example, tobacco or other non-tobacco products, which may or may not contain nicotine.

SUMMARY

A first aspect of the present disclosure provides an article for use with an apparatus for heating smokable material to volatilize at least one component of the smokable material, the article comprising: a body of heating material that is heatable by penetration with a varying magnetic field; a non-smokable thermally-conductive element in thermal contact with the body of heating material and arranged relative to the body of heating material so that heating of the heating material causes progressive heating of the element; and smokable material in thermal contact with the element and arranged relative to the element so that the progressive heating causes progressive heating of the smokable material.

In an exemplary embodiment, the element is in surface contact with the body of heating material.

In an exemplary embodiment, the smokable material is in surface contact with the element.

In an exemplary embodiment, the body of heating material is at least partially embedded in the element.

In an exemplary embodiment, the body of heating material is fully embedded in the element.

In an exemplary embodiment, the element extends along at least a majority of a length of the smokable material.

In an exemplary embodiment, the body of heating material is located at only a first end portion of the element; and an opposite second end portion of the element is free from heating material that is heatable by penetration with a varying magnetic field.

In an exemplary embodiment, the heating material comprises one or more materials selected from the group consisting of: an electrically-conductive material, a magnetic material, and a magnetic electrically-conductive material.

In an exemplary embodiment, the heating material comprises a metal or a metal alloy.

In an exemplary embodiment, the heating material comprises one or more materials selected from the group consisting of: aluminum, gold, iron, nickel, cobalt, conductive carbon, graphite, plain-carbon steel, stainless steel, ferritic stainless steel, copper, and bronze.

In an exemplary embodiment, the smokable material comprises tobacco and/or one or more humectants.

In an exemplary embodiment, the smokable material is non-liquid.

A second aspect of the present disclosure provides an apparatus for heating smokable material to volatilize at least one component of the smokable material, the apparatus comprising: a magnetic field generator for generating a varying magnetic field; a body of heating material that is heatable by penetration with the varying magnetic field; a non-smokable thermally-conductive element in thermal contact with the body of heating material and arranged relative to the body of heating material so that heating of the heating material by penetration with the varying magnetic field causes progressive heating of the element; and a heating zone for receiving at least a portion of an article comprising smokable material, wherein the heating zone is in thermal contact with the element and is arranged relative to the element so that the progressive heating causes progressive heating of the heating zone.

In an exemplary embodiment, the body of heating material is at least partially embedded in the element.

In an exemplary embodiment, the body of heating material is fully embedded in the element.

In an exemplary embodiment, the body of heating material is located at only a first end portion of the element; and an opposite second end portion of the element is free from heating material that is heatable by penetration with a varying magnetic field.

In an exemplary embodiment, the element projects into the heating zone.

In an exemplary embodiment, the element extends at least partially around the heating zone.

In an exemplary embodiment, the element extends along at least a majority of a length of the heating zone.

In an exemplary embodiment, first and second portions of the element have different respective thermal masses.

In an exemplary embodiment, the second portion of the element is thicker than the first portion of the element; the body of heating material is in surface contact with only the first portion of the element; and the second portion of the element is free from heating material that is heatable by penetration with a varying magnetic field.

In an exemplary embodiment, the thermal mass varies with distance along the element.

In an exemplary embodiment, the thermal mass varies over at least a majority of a length of the element.

In an exemplary embodiment, the first and second portions of the element have different respective thermal masses as a result of a thickness of the first portion of the heating material being different to a thickness of the second portion of the heating material.

In an exemplary embodiment, a material composition of the first portion of the element is the same as a material composition of the second portion of the element.

In an exemplary embodiment, a material composition of the element is homogenous throughout the element.

In an exemplary embodiment, a density of the first portion of the element is the same as a density of the second portion of the element.

In an exemplary embodiment, a density of the element is homogenous throughout the element.

In an exemplary embodiment, the apparatus is for heating smokable material to volatilize at least one component of the smokable material without combusting the smokable material.

A third aspect of the present disclosure provides a system for heating smokable material to volatilize at least one component of the smokable material, the system comprising: an article comprising smokable material; and an apparatus, comprising: a magnetic field generator for generating a varying magnetic field, a body of heating material that is heatable by penetration with the varying magnetic field, a non-smokable thermally-conductive element in thermal contact with the body of heating material and arranged relative to the body of heating material so that heating of the heating material by penetration with the varying magnetic field causes progressive heating of the element, and a heating zone for receiving at least a portion of the article, wherein the heating zone is in thermal contact with the element and is arranged relative to the element so that the progressive heating causes progressive heating of the heating zone.

In an exemplary embodiment, the apparatus of the system of the third aspect is the apparatus of the second aspect. The apparatus of the system of the third aspect may have any one or more of the features discussed above as being present in respective exemplary embodiments of the apparatus of the second aspect.

A fourth aspect of the present disclosure provides a method of heating smokable material to volatilize at least one component of the smokable material, the method comprising: providing a body of heating material that is heatable by penetration with a varying magnetic field; providing a non-smokable thermally-conductive element in thermal contact with the body of heating material and arranged relative to the body of heating material so that heating of the heating material by penetration with the varying magnetic field causes progressive heating of the element; providing smokable material in thermal contact with the element; and penetrating the heating material with the varying magnetic field so as to cause progressive heating of the element, thereby to cause progressive heating of the smokable material.

BRIEF DESCRIPTION OF THE DRAWINGS

Embodiments of the disclosure will now be described, by way of example only, with reference to the accompanying drawings, in which.

DETAILED DESCRIPTION

Figure 1:
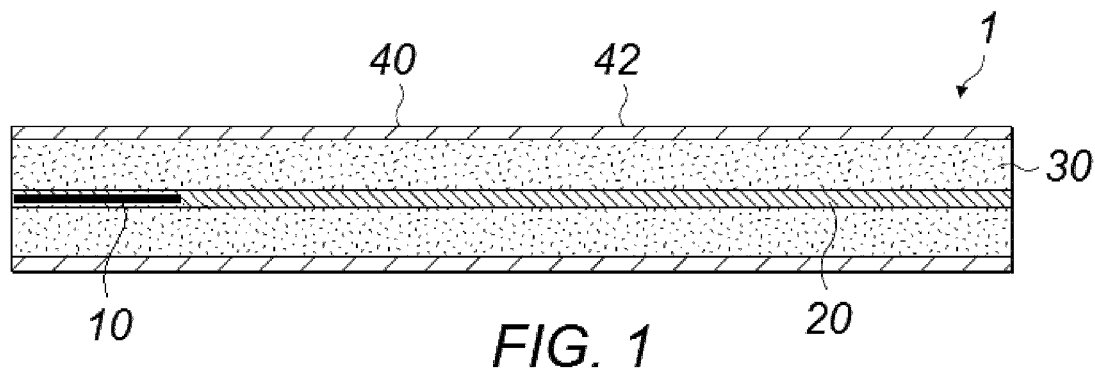
FIG. 1 shows a schematic cross-sectional view of an example of an article for use with an apparatus for heating smokable material to volatilize at least one component of the smokable material.

As used herein, the term "smokable material" includes materials that provide volatilized components upon heating, typically in the form of vapor or an aerosol. "Smokable material" may be a non-tobacco-containing material or a tobacco-containing material. "Smokable material" may, for example, include one or more of tobacco per se, tobacco derivatives, expanded tobacco, reconstituted tobacco, tobacco extract, homogenized tobacco or tobacco substitutes. The smokable material can be in the form of ground tobacco, cut rag tobacco, extruded tobacco, reconstituted tobacco, reconstituted smokable material, liquid, gel, gelled sheet, powder, or agglomerates, or the like. "Smokable material" also may include other, non-tobacco, products, which, depending on the product, may or may not contain nicotine. "Smokable material" may comprise one or more humectants, such as glycerol or propylene glycol.

As used herein, the term "heating material" or "heater material" refers to material that is heatable by penetration with a varying magnetic field.

Induction heating is a process in which an electrically-conductive object is heated by penetrating the object with a varying magnetic field. The process is described by Faraday's law of induction and Ohm's law. An induction heater may comprise an electromagnet and a device for passing a varying electrical current, such as an alternating current, through the electromagnet. When the electromagnet and the object to be heated are suitably relatively positioned so that the resultant varying magnetic field produced by the electromagnet penetrates the object, one or more eddy currents are generated inside the object. The object has a resistance to the flow of electrical currents. Therefore, when such eddy currents are generated in the object, their flow against the electrical resistance of the object causes the object to be heated. This process is called Joule, ohmic, or resistive heating. An object that is capable of being inductively heated is known as a susceptor.

It has been found that, when the susceptor is in the form of a closed circuit, magnetic coupling between the susceptor and the electromagnet in use is enhanced, which results in greater or improved Joule heating.

Magnetic hysteresis heating is a process in which an object made of a magnetic material is heated by penetrating the object with a varying magnetic field. A magnetic material can be considered to comprise many atomic-scale magnets, or magnetic dipoles. When a magnetic field penetrates such material, the magnetic dipoles align with the magnetic field.

Therefore, when a varying magnetic field, such as an alternating magnetic field, for example as produced by an electromagnet, penetrates the magnetic material, the orientation of the magnetic dipoles changes with the varying applied magnetic field. Such magnetic dipole reorientation causes heat to be generated in the magnetic material.

When an object is both electrically-conductive and magnetic, penetrating the object with a varying magnetic field can cause both Joule heating and magnetic hysteresis heating in the object. Moreover, the use of magnetic material can strengthen the magnetic field, which can intensify the Joule heating.

In each of the above processes, as heat is generated inside the object itself, rather than by an external heat source by heat conduction, a rapid temperature rise in the object and more uniform heat distribution can be achieved, particularly through selection of suitable object material and geometry, and suitable varying magnetic field magnitude and orientation relative to the object. Moreover, as induction heating and magnetic hysteresis heating do not require a physical connection to be provided between the source of the varying magnetic field and the object, design freedom and control over the heating profile may be greater, and cost may be lower.

Figure 2:
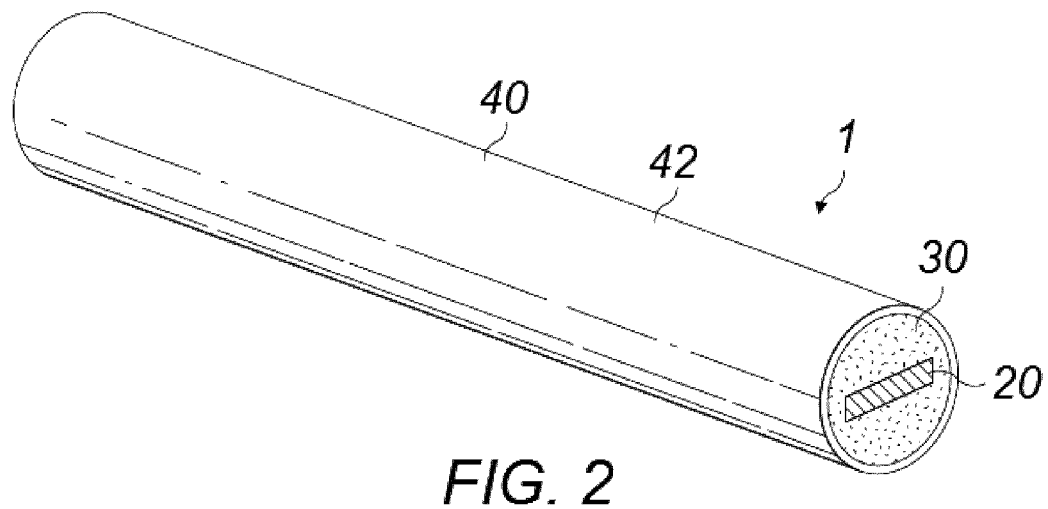
FIG. 2 shows a schematic perspective view of the article of FIG. 1.

Referring to FIGS. 1 and 2 there are shown a schematic cross-sectional view and a schematic perspective view of an example of an article according to an embodiment of the disclosure. The article 1 is for use with an apparatus for heating smokable material to volatilize at least one component of the smokable material.

The article 1 comprises a body of heating material 10 that is heatable by penetration with a varying magnetic field, a non-smokable thermally-conductive element 20, smokable material 30, and a cover 40 around the smokable material 30. Examples of each of these materials are discussed below.

The cover 40 defines an outer surface of the article 1 and may contact the apparatus in use. In this embodiment, the article 1 is elongate and cylindrical with a substantially circular cross-section. However, in other embodiments, the article 1 may have a cross-section other than circular and/or not be elongate and/or not be cylindrical. In this embodiment, the article 1 has proportions approximating those of a cigarette.

In this embodiment, the cover 40 comprises a wrapper 42 that is wrapped around the smokable material 30 so that free ends of the wrapper 42 overlap each other. The wrapper 42 thus forms all of, or a majority of, a circumferential outer surface of the article 1. The wrapper 42 may be formed from paper, reconstituted smokable material, such as reconstituted tobacco, or the like. The cover 40 of this embodiment also comprises an adhesive (not shown) that adheres the overlapped free ends of the wrapper 42 to each other. The adhesive may comprise one or more of, for example, gum Arabic, natural or synthetic resins, starches, and varnish. The adhesive helps prevent the overlapped free ends of the wrapper 42 from separating. In other embodiments, the adhesive may be omitted.

The cover 40 encircles the smokable material 30. The cover 40 helps to protect the smokable material 30 from damage during transport and use of the article 1. During use, the cover 40 may also help to direct the flow of air into and through the smokable material 30, and may help to direct the flow of vapor or aerosol through and out of the smokable material 30.

In this embodiment, the smokable material 30 is in the form of a tube. The tube has a substantially circular cross-section. The smokable material 30 extends from one end of the article 1 to an opposite end of the article 1. Thus, in use, air may be drawn into the smokable material 30 at one end of the article 1, the air may pass through the smokable material 30 and pick up volatilized components released from the smokable material 30, and then the volatilized components, typically in the form of vapor or an aerosol, may be drawn out of the smokable material 30 at the opposite end of the article 1. In this embodiment in which the article 1 is elongate, these ends of the article 1 between which the smokable material 30 extends are opposite longitudinal ends of the article 1. However, in other embodiments, the ends may be any two ends or sides of the article, such as any two opposite ends or sides of the article.

The element 20 is elongate and extends from one end of the smokable material 30 to an opposite end of the smokable material 30. This can help to provide more complete heating of the smokable material 30 in use. However, in other embodiments, the element 20 may not extend to either of the opposite ends of the smokable material 30, or may extend to only one of the ends of the smokable material 30 and be spaced from the other of the ends of the smokable material 30. The element 20 may extend along a majority of a length of the smokable material 30.

The element 20 extends from one end of the article 1 to an opposite end of the article 1. This can aid manufacturing of the article 1. However, in other embodiments, the element 20 may not extend to either of the opposite ends of the article 1, or may extend to only one of the ends of the article 1 and be spaced from the other of the ends of the article 1.

In this embodiment, the element 20 extends along an axis that is substantially aligned with an axis of the article 1. This can aid manufacturing of the article 1. In this embodiment, the aligned axes are coincident. In a variation to this embodiment, the aligned axes may be parallel to each other. However, in other embodiments, the axes may be oblique to each other.

In this embodiment, the element 20 is encircled by the smokable material 30. That is, the smokable material 30 extends around the element 20. In embodiments in which the element 20 does not extend to either of the opposite ends of the smokable material 30, the smokable material 30 may extend around the element 20 and also cover the ends of the element 20, so that the element 20 is surrounded by the smokable material 30.

The element 20 has a rectangular, or substantially rectangular, cross-section perpendicular to its length. The element 20 has two opposing major surfaces joined by two minor surfaces. Therefore, the depth or thickness of the element 20 is relatively small as compared to the other dimensions of the element 20. However, in other embodiments, the element 20 may have a cross-section that is a shape other than rectangular, such as circular, elliptical, annular, polygonal, square, triangular, star-shaped, radially-finned, X-shaped, T-shaped, hollow, or perforated.

In this embodiment, the cross-section of the element 20 is constant along the length of the element 20. Moreover, in this embodiment, the element 20 is planar, or substantially planar. The element 20 of this embodiment can be considered a flat strip or ribbon. However, in other embodiments, this may not be the case.

In some embodiments, the element 20 may be non-planar. For example, the element 20 may follow a wavelike or wavy path, be twisted, be corrugated, be helical, have a spiral shape, comprise a plate or strip or ribbon having protrusions thereon and/or indentations therein, comprise a mesh, or have a non-uniform non-planar shape. Such non-planar shapes may help air passing through the article 1 to pick up the volatilized material created when the smokable material 30 is heated. Non-planar shapes can provide a tortuous path for air to follow, creating turbulence in the air and causing better heat transfer from the element 20 to the smokable material 30. The non-planar shapes can also increase the surface area of the element 20 per unit length of the element 20. This can result in greater or improved heating of the smokable material 30 by the element 20.

The element 20 is in both thermal and surface contact with the body of heating material 10. In this embodiment, the body of heating material 10 is embedded in the element 20. More specifically, the body of heating material 10 is surrounded by the element 20, so that the body of heating material 10 is fully embedded in the element 20. In other embodiments, the body of heating material 10 may be only partially embedded in the element 20, or the body of heating material 10 may be on a surface of the element 20 and not embedded in the element 20. In some other embodiments, the element 20 may be in thermal contact with the body of heating material 10 but not in surface contact with the body of heating material 10.

In this embodiment, the body of heating material 10 is located at only a first end portion of the element 20. An opposite second end portion of the element 20 is free from heating material. Therefore, the body of heating material 10 and the element 20 are relatively arranged so that heating of the heating material in use causes progressive heating of the element 20. More specifically, heat emanating from the body of heating material 10 in use heats the first end portion of the element 20 first, and then portions of the element 20 increasingly far from the first end portion of the element 20 are heated in turn. In other embodiments, the body of heating material 10 and the element 20 may be relatively arranged in a different manner that still enables heating of the heating material 10 to cause progressive heating of the element 20. For example, the body of heating material 10 may be located at the middle of the element 20 and remote from both the first and second end portions of the element 20.

The body of heating material 10 has a rectangular, or substantially rectangular, cross-section perpendicular to its length. The body of heating material 10 has two opposing major surfaces joined by two minor surfaces. Therefore, the depth or thickness of the body of heating material 10 is relatively small as compared to the other dimensions of the body of heating material 10. However, in other embodiments, the body of heating material 10 may have a cross-section that is a shape other than rectangular, such as circular, elliptical, annular, star-shaped, polygonal, square, triangular, X-shaped, or T-shaped.

The smokable material 30 is in thermal contact with the element 20. Therefore, the element 20 is heatable in use to heat the smokable material 30. In this embodiment, the smokable material 30 is in surface contact with the element 20. This is achieved by adhering the smokable material 30 to the element 20. However, in other embodiments, the fixing may be by other than adhesion. In some embodiments the smokable material 30 may not be fixed to the element 20 as such.

In this embodiment, the smokable material 30 encircles the element 20 along the full length of the element 20. Therefore, the smokable material 30 is arranged relative to the element 20 so that the progressive heating of the element 20 discussed above causes progressive heating of the smokable material 30. More specifically, in use, heat emanating from a first section of the element 20 at a location relatively close to the body of heating material 10 heats an adjacent first portion of the smokable material 30 first. This initiates volatilization of at least one component of the smokable material of that first portion of the smokable material and formation of an aerosol therein. Over time, the temperature of a second section of the element 20 relatively far from the body of heating material 10 increases due to thermal conduction from the first portion of the element 20. This causes a second portion of the smokable material 30 adjacent the second section of the element 20 to be heated by heat emanating from the second section of the element 20. This initiates volatilization of at least one component of the smokable material of that second portion of the smokable material and formation of an aerosol therein. Accordingly, there is provided progressive heating of the smokable material 30 of the article 1, over time. This helps to enable an aerosol to be formed and released relatively rapidly from an end of the article 1 for inhalation by a user, yet provides time-dependent release of aerosol from the smokable material 30, so that aerosol continues to be formed and released even after the first portion of the smokable material 30 has ceased generating aerosol. Such cessation of aerosol generation may occur as a result of the first portion of the smokable material becoming exhausted of volatilizable components.

In other embodiments, the smokable material 30 and the element 20 may be relatively arranged in a different manner that still enables the progressive heating of the element 20 to cause progressive heating of the smokable material 30. For example, smokable material 30 may be located on only one side of the element 20 and/or may not extend along the full length of the element 20, and yet the progressive heating of the element 20 in use causes progressive heating of the smokable material 30. In some embodiments, the smokable material 30 may be spaced from the element 20 by a gap and yet still be in thermal contact with the element 20 and arranged relative to the element 20 so that the progressive heating of the element 20 causes progressive heating of the smokable material 30.

Figure 3:
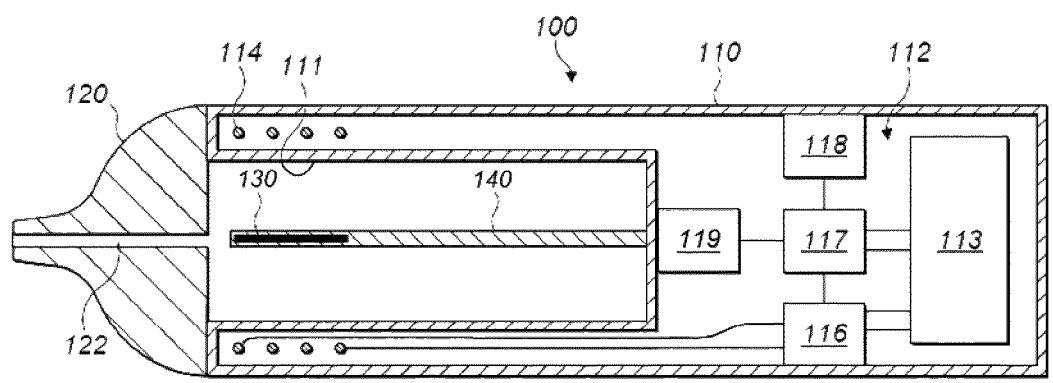
FIG. 3 shows a schematic cross-sectional view of an example of an apparatus for heating smokable material to volatilize at least one component of the smokable material.

Referring to FIG. 3 there is shown a schematic perspective view of an example of an apparatus according to an embodiment of the disclosure. The apparatus 100 is for heating smokable material to volatilize at least one component of the smokable material.

The apparatus 100 comprises a magnetic field generator 112 for generating a varying magnetic field, a body of heating material 130 that is heatable by penetration with the varying magnetic field, a non-smokable thermally-conductive element 140 in both thermal and surface contact with the body of heating material 130 and arranged relative to the body of heating material 130 so that heating of the heating material by penetration with the varying magnetic field causes progressive heating of the element 140, and a heating zone 111 for receiving at least a portion of an article comprising smokable material, wherein the heating zone 111 is in thermal contact with the element 140 and is arranged relative to the element 140 so that the progressive heating causes progressive heating of the heating zone 111.

More specifically, the apparatus 100 of this embodiment comprises a body 110 and a mouthpiece 120. The mouthpiece 120 may be made of any suitable material, such as a plastics material, cardboard, cellulose acetate, paper, metal, glass, ceramic, or rubber. The mouthpiece 120 defines a channel 122 therethrough. The mouthpiece 120 is locatable relative to the body 110 so as to cover an opening into the heating zone 111. When the mouthpiece 120 is so located relative to the body 110, the channel 122 of the mouthpiece 120 is in fluid communication with the heating zone 111. In use, the channel 122 acts as a passageway for permitting volatilized material to pass from an article inserted in the heating zone 111 to an exterior of the apparatus 100. In this embodiment, the mouthpiece 120 of the apparatus 100 is releasably engageable with the body 110 so as to connect the mouthpiece 120 to the body 110. In other embodiments, the mouthpiece 120 and the body 110 may be permanently connected, such as through a hinge or flexible member. In some embodiments, such as embodiments in which the article itself comprises a mouthpiece, the mouthpiece 120 of the apparatus 100 may be omitted.

The apparatus 100 may define an air inlet that fluidly connects the heating zone 111 with the exterior of the apparatus 100. Such an air inlet may be defined by the body 110 of the apparatus 100 and/or by the mouthpiece 120 of the apparatus 100. A user may be able to inhale the volatilized component(s) of the smokable material by drawing the volatilized component(s) through the channel 122 of the mouthpiece 120. As the volatilized component(s) are removed from the article, air may be drawn into the heating zone 111 via the air inlet of the apparatus 100.

In this embodiment, the body 110 comprises the heating zone 111. The heating zone 111 comprises a recess 111 for receiving at least a portion of the article. In other embodiments, the heating zone 111 may be other than a recess, such as a shelf, a surface, or a projection, and may require mechanical mating with the article in order to co-operate with, or receive, the article. In this embodiment, the heating zone 111 is elongate, and is sized and shaped to accommodate the whole article. In other embodiments, the heating zone 111 may be dimensioned to receive only a portion of the article.

In this embodiment, the magnetic field generator 112 comprises an electrical power source 113, a coil 114, a device 116 for passing a varying electrical current, such as an alternating current, through the coil 114, a controller 117, and a user interface 118 for user-operation of the controller 117.

The electrical power source 113 of this embodiment is a rechargeable battery. In other embodiments, the electrical power source 113 may be other than a rechargeable battery, such as a non-rechargeable battery, a capacitor, a battery-capacitor hybrid, or a connection to a mains electricity supply.

The coil 114 may take any suitable form. In this embodiment, the coil 114 is a helical coil of electrically-conductive material, such as copper. In some embodiments, the magnetic field generator 112 may comprise a magnetically permeable core around which the coil 114 is wound. Such a magnetically permeable core concentrates the magnetic flux produced by the coil 114 in use and makes a more powerful magnetic field. The magnetically permeable core may be made of iron, for example. In some embodiments, the magnetically permeable core may extend only partially along the length of the coil 114, so as to concentrate the magnetic flux only in certain regions. In some embodiments, the coil may be a flat coil. That is, the coil may be a two-dimensional spiral.

It will be understood from consideration of FIG. 3 that in this embodiment the element 140 projects into the heating zone 111. The element 140 has a length from a free first end to a second end at which the element 140 is mounted to the rest of the body 110. The free end is arranged relative to the heating zone 111 so as to enter the article as the article is inserted into the heating zone 111. The element 140 extends along a majority of a length of the heating zone 111. In some embodiments, the element 140 extends along the full length of the heating zone 111.

The element 140 has a rectangular cross-section perpendicular to its length. The depth or thickness of the element 140 is relatively small as compared to the other dimensions of the element 140. However, in other embodiments, the element 140 may have a cross-section that is a shape other than rectangular, such as circular, elliptical, annular, star-shaped, polygonal, square, triangular, X-shaped, or T-shaped. In this embodiment, the cross-section of the element 140 is constant along the length of the element 140. Moreover, in this embodiment, the element 140 is planar, or substantially planar. The element 140 of this embodiment can be considered a flat strip. However, in other embodiments, this may not be the case. For example, in some embodiments the element 140 may be hollow or perforated.

In this embodiment, the body of heating material 130 is embedded in the element 140. More specifically, the body of heating material 130 is surrounded by the element 140, so that the body of heating material 130 is fully embedded in the element 140. In other embodiments, the body of heating material 130 may be only partially embedded in the element 140, or the body of heating material 130 may be on a surface of the element 140 and not embedded in the element 140. In some other embodiments, the element 140 may be in thermal contact with the body of heating material 130 but not in surface contact with the body of heating material 130.

The body of heating material 130 has a rectangular, or substantially rectangular, cross-section perpendicular to its length. The body of heating material 130 has two opposing major surfaces joined by two minor surfaces. Therefore, the depth or thickness of the body of heating material 130 is relatively small as compared to the other dimensions of the body of heating material 130. However, in other embodiments, the body of heating material 130 may have a cross-section that is a shape other than rectangular, such as circular, elliptical, annular, star-shaped, polygonal, square, or triangular.

In this embodiment, the body of heating material 130 is located at only a first end portion of the element 140, which in this case is at the free end of the element 140. An opposite second end portion of the element 140 is free from heating material. Therefore, the body of heating material 130 and the element 140 are relatively arranged so that heating of the heating material in use causes progressive heating of the element 140. More specifically, heat emanating from the body of heating material 130 in use heats the first end portion of the element 140 first. Portions of the element 140 increasingly far from the first end portion of the element 140 are then heated in turn by thermal conduction from the first end portion of the element 140. In other embodiments, the body of heating material 130 and the element 140 may be relatively arranged in a different manner that still enables heating of the heating material 130 to cause progressive heating of the element 140. For example, the body of heating material 130 may be located at only the second end portion of the element 140, and the first end portion of the element 140 may be free from heating material.

Figure 6:
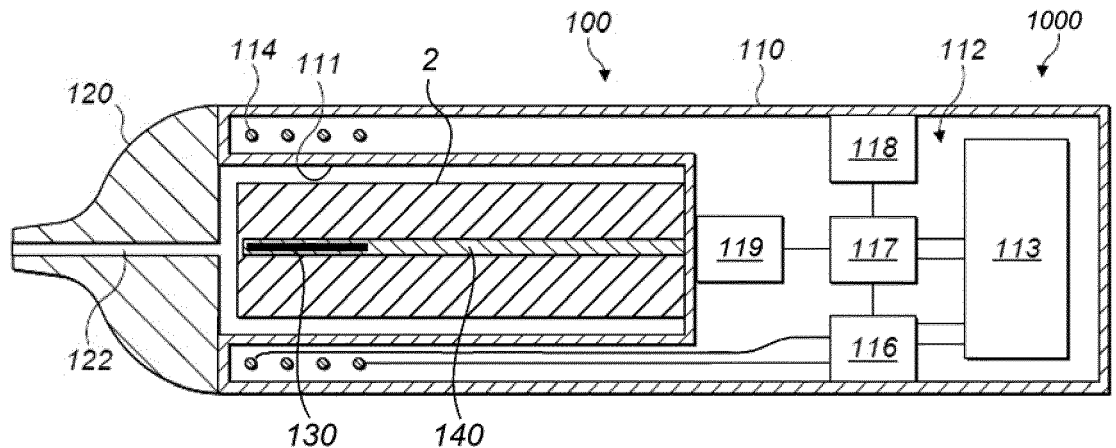
FIG. 6 shows a schematic cross-sectional view of an example of a system comprising an article comprising smokable material, and the apparatus of FIG. 3 for heating the smokable material to volatilize at least one component of the smokable material.

It will be appreciated that, since the element 140 projects into the heating zone 111, the progressive heating of the element 140 causes progressive heating of the heating zone 111, and thus progressive heating of anything in the heating zone 111. Accordingly, when an article comprising smokable material is located in the heating zone 111 in use (as shown in FIG. 6, discussed below), heat emanating from the first portion of the element 140 at a location relatively close to the body of heating material 130 heats smokable material in a first portion of the article that is relatively close to the body of heating material 130. This initiates volatilization of at least one component of the smokable material of that first portion of the article and formation of an aerosol therein. Over time, the temperature of a second portion of the element 140 relatively far from the body of heating material 130 increases due to thermal conduction from the first portion of the element 140. This causes smokable material in a second portion of the article adjacent the second portion of the element 140 to be heated by heat emanating from the second portion of the element 140. This initiates volatilization of at least one component of the smokable material of that second portion of the article and formation of an aerosol therein. Accordingly, there is provided progressive heating of the smokable material of the article, over time. Similarly to as discussed above, this helps to enable an aerosol to be formed and released relatively rapidly from an end of the article for inhalation by a user, yet provides time-dependent release of aerosol from the smokable material, so that aerosol continues to be formed and released even after the smokable material in the first portion of the article has ceased generating aerosol.

When the article is located in the heating zone 111, the element 140 is in thermal contact with the smokable material of the article. In some embodiments, when the article is located in the heating zone 111, the element 140 is in surface contact with the smokable material of the article. Thus, heat may be conducted directly from the element 140 to the smokable material. In other embodiments, the element 140 may be kept out of surface contact with the smokable material. For example, in some embodiments, the smokable material may be spaced from the element 140 by a gap or by a wrapper of the article, and yet still be in thermal contact with the element 140.

In this embodiment, the coil 114 extends along a longitudinal axis that is substantially aligned with a longitudinal axis of the heating zone 111. The aligned axes are coincident. In a variation to this embodiment, the aligned axes may be parallel to each other. However, in other embodiments, the axes may be oblique to each other. Moreover, the coil 114 extends along a longitudinal axis that is substantially coincident with a longitudinal axis of the element 140. In other embodiments, the longitudinal axes of the coil 114 and the element 140 may be aligned with each other by being parallel to each other, or may be oblique to each other. In this embodiment, the coil 114 and the rest of the magnetic field generator 112 is in a fixed position relative to the element 140 and the heating zone 111.

In this embodiment, the device 116 for passing a varying current through the coil 114 is electrically connected between the electrical power source 113 and the coil 114. In this embodiment, the controller 117 also is electrically connected to the electrical power source 113, and is communicatively connected to the device 116 to control the device 116. More specifically, in this embodiment, the controller 117 is for controlling the device 116, so as to control the supply of electrical power from the electrical power source 113 to the coil 114. In this embodiment, the controller 117 comprises an integrated circuit (IC), such as an IC on a printed circuit board (PCB). In other embodiments, the controller 117 may take a different form. In some embodiments, the apparatus may have a single electrical or electronic component comprising the device 116 and the controller 117. The controller 117 is operated in this embodiment by user-operation of the user interface 118. In this embodiment, the user interface 118 is located at the exterior of the body 110. The user interface 118 may comprise a push-button, a toggle switch, a dial, a touchscreen, or the like. In other embodiments, the user interface 118 may be remote and connected to the rest of the apparatus wirelessly, such as via Bluetooth.

In this embodiment, operation of the user interface 118 by a user causes the controller 117 to cause the device 116 to cause an alternating electrical current to pass through the coil 114, so as to cause the coil 114 to generate an alternating magnetic field. The coil 114 and the body of heating material 130 of the apparatus 100 are suitably relatively positioned so that the varying magnetic field produced by the coil 114 penetrates the body of heating material 130. In this embodiment, the heating material is an electrically-conductive material, and so this penetration causes the generation of one or more eddy currents in the heating material. The flow of eddy currents in the heating material against the electrical resistance of the heating material causes the heating material to be heated by Joule heating. When the heating material is made of a magnetic material, the orientation of magnetic dipoles in the heating material changes with the changing applied magnetic field, which causes heat to be generated in the heating material.

In this embodiment, an impedance of the coil 114 of the magnetic field generator 112 is equal, or substantially equal, to an impedance of the body of heating material 130. If the impedance of the body of heating material 130 were instead lower than the impedance of the coil 114, then the voltage generated across body of heating material 130 in use may be lower than the voltage that may be generated across the body of heating material 130 when the impedances are matched. Alternatively, if the impedance of the body of heating material 130 were instead higher than the impedance of the coil 114, then the electrical current generated in the body of heating material 130 in use may be lower than the current that may be generated in the body of heating material 130 when the impedances are matched. Matching the impedances may help to balance the voltage and current to maximize the heating power generated at the body of heating material 130 in use. In some embodiments, the impedance of the device 116 may be equal, or substantially equal, to a combined impedance of the coil 114 and the heating material 130.

The apparatus 100 of this embodiment comprises a temperature sensor 119 for sensing a temperature of the heating zone 111. The temperature sensor 119 is communicatively connected to the controller 117, so that the controller 117 is able to monitor the temperature of the heating zone 111. On the basis of one or more signals received from the temperature sensor 119, the controller 117 may cause the device 116 to adjust a characteristic of the varying or alternating electrical current passed through the coil 114 as necessary, in order to ensure that the temperature of the heating zone 111 remains within a predetermined temperature range. The characteristic may be, for example, amplitude or frequency or duty cycle. Within the predetermined temperature range, in use the smokable material within an article located in the heating zone 111 is heated sufficiently to volatilize at least one component of the smokable material without combusting the smokable material. Accordingly, the controller 117, and the apparatus 100 as a whole, is arranged to heat the smokable material to volatilize the at least one component of the smokable material without combusting the smokable material. In some embodiments, the temperature range is about 50° C. to about 300° C., such as between about 50° C. and about 250° C., between about 50° C. and about 150° C., between about 50° C. and about 120° C., between about 50° C. and about 100° C., between about 50° C. and about 80° C., or between about 60° C. and about 70° C. In some embodiments, the temperature range is between about 170° C. and about 220° C. In other embodiments, the temperature range may be other than this range. In some embodiments, the upper limit of the temperature range could be greater than 300° C. In some embodiments, the temperature sensor 119 may be omitted. In some embodiments, the heating material may have a Curie point temperature selected on the basis of the maximum temperature to which it is desired to heat the heating material, so that further heating above that temperature by induction heating the heating material is hindered or prevented.

Figure 4:
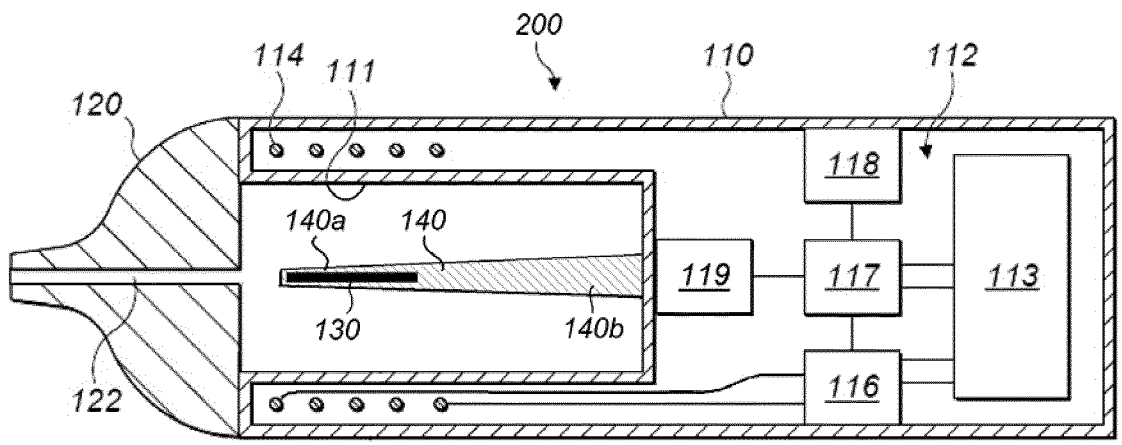
FIG. 4 shows a schematic cross-sectional view of an example of another an apparatus for heating smokable material to volatilize at least one component of the smokable material.

Referring to FIG. 4 there is shown a schematic cross-sectional view of an example of another apparatus according to an embodiment of the disclosure. The apparatus 200 of FIG. 4 is identical to the apparatus 100 of FIG. 3 except for the form of the element 140 of the apparatus. Therefore, in the interest of conciseness, features common to the two embodiments will not be described again in detail. Any of the herein-described possible variations to the apparatus 100 of FIG. 3 may be made to the apparatus 200 of FIG. 4 to form separate respective embodiments.

The thermal mass of a body is proportional to the mass (weight) of the body multiplied by its heat capacity (the ability of the body to store thermal energy). Different portions of a body can have different thermal masses only if the weight or densities are different, and/or if their heat capacities are different.

In this embodiment, first and second portions 140a, 140b of the element 140 have different respective thermal masses. A material composition and density of the first portion 140a of the element 140 is the same as a material composition and density of the second portion 140b of the element 140. In fact, the material composition and density of the element 140 may be homogeneous throughout the element 140. However, the first and second portions 140a, 140b of the element 140 have different respective thermal masses as a result of a thickness of the first portion 140a of the element 140 being different to a thickness of the second portion 140b of the element 140. More specifically, the second portion 140b of the element 140 has a greater thermal mass than the first portion 140a of the element 140, as a result of the second portion 140b of the element 140 being thicker than the first portion 140a of the element 140.

In this embodiment, the thermal mass increases continuously with distance along the length of the element 140 from the free first end of the element 140 to the second end of the element 140. More specifically, in this embodiment, the thermal mass increases linearly, or substantially linearly, with distance along the length. This is due to the thickness of the element 140 increasing linearly, or substantially linearly, with distance along the length of the element 140 from the free end. In other words, the element 140 is linearly tapered. However, in other embodiments, the thermal mass may vary other than continuously with distance along the length of the element 140. For example, the variation may be stepwise, or continuous over at least one section of the element 140 and stepwise over at least one other section of the element 140. The skilled person would readily be able to determine a manner in which they wish the thermal mass to vary, to provide a desired progressive heating profile in use. They would also be able to select an appropriate profile for how the thickness of the element 140 varies along its length to provide that desired progressive heating profile.

In other embodiments, the first and second portions 140a, 140b of the element 140 may have different respective thermal masses as a result of an alternative characteristic that varies between the first and second portions 140a, 140b. For instance, the first and second portions 140a, 140b of the element 140 may have different respective thermal masses as a result of a density or material composition of the first portion 140a of the element 140 being different to that of the second portion 140b of the element 140.

The body of heating material 130 is embedded within only the first portion 140a of the element 140. The second portion 140b of the element 140 is free from heating material. Penetration of the body of heating material 130 with the varying magnetic field causes the first portion 140a of the element 140 to be heated at a relatively great rate. Over time, the temperature of the second portion 140b of the element 140 increases due to thermal conduction from the first portion 140a of the element 140. However, the rate of heating of the element 140 reduces with distance from the body of heating material 130, due to the increasing thermal mass with distance from the body of heating material 130.

Figure 7:
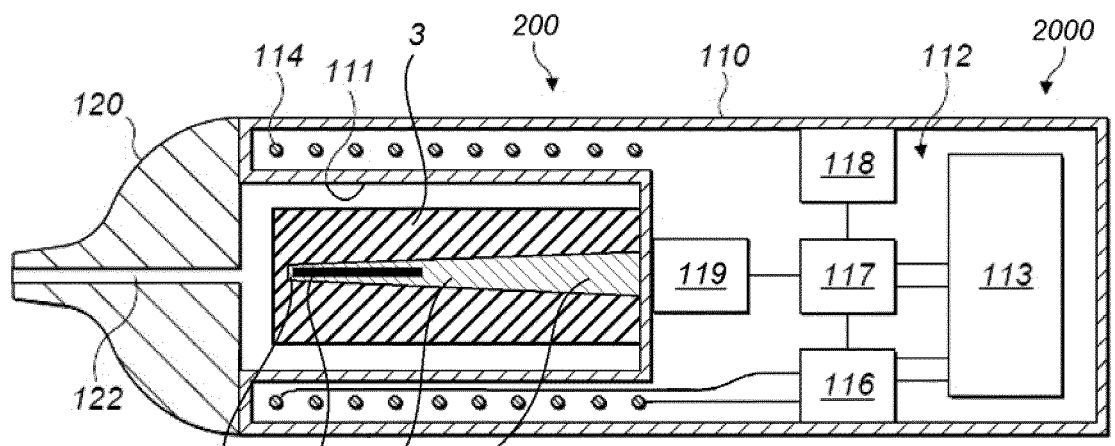
FIG. 7 shows a schematic cross-sectional view of an example of another system comprising an article comprising smokable material, and the apparatus of FIG. 4 for heating the smokable material to volatilize at least one component of the smokable material.

Accordingly, during penetration on the body of heating material 130 with the varying magnetic field generated by the generator 112, a similar progressive heating effect to that discussed above can be provided. That is, in use, when an article is located in the heating zone 111 (as shown in FIG. 7, discussed below), heat emanating from the first portion 140a of the element 140 heats smokable material in a first portion of the article that is relatively close to the body of heating material 130. This initiates volatilization of at least one component of the smokable material of that first portion of the article and formation of an aerosol therein. Over time, the temperature of the second portion 140b of the element 140 relatively far from the body of heating material 130 increases due to thermal conduction from the first portion 140a of the element 140. This causes smokable material in a second portion of the article adjacent the second portion 140b of the element 140 to be heated by heat emanating from the second portion 140b of the element 140. This initiates volatilization of at least one component of the smokable material of that second portion of the article and formation of an aerosol therein.

It will be noted that, in this embodiment, the body of heating material 130 is located in the first portion 140a of the element 140, which is closer to the channel 122 of the mouthpiece 120 than the second portion 140b of the element 140. Therefore, in use the first portion of the article to be heated to volatilize component(s) of the smokable material is also closer to the channel 122 of the mouthpiece 120 than the second portion of the article. However, in other embodiments the body of heating material 130 may instead be arranged in the second portion 140b of the element 140.

Figure 5:
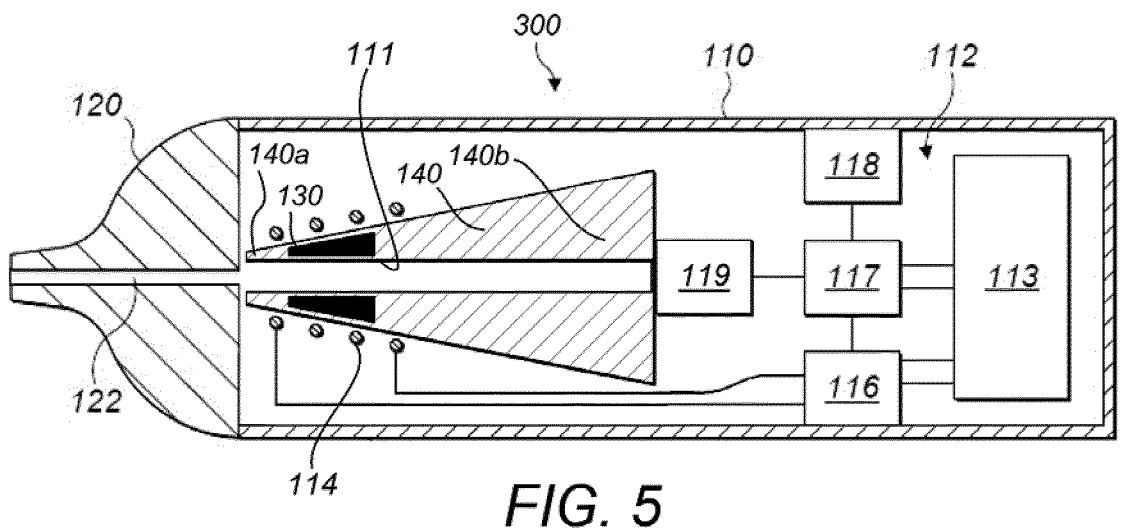
FIG. 5 shows a schematic cross-sectional view of an example of another an apparatus for heating smokable material to volatilize at least one component of the smokable material.

Referring to FIG. 5 there is shown a schematic cross-sectional view of an example of another apparatus according to an embodiment of the disclosure. The apparatus 300 of FIG. 5 is identical to the apparatus 100 of FIG. 3 except for the form of the heating element, the non-smokable thermally-conductive element, the heating zone, and the coil of the apparatus. Therefore, in the interest of conciseness, features common to the two embodiments will not be described again in detail. Any of the herein-described possible variations to the apparatus 100 of FIG. 3 may be made to the apparatus 300 of FIG. 5 to form separate respective embodiments of apparatus.

As noted above, in the apparatus 100 of FIG. 3, the element 140 projects into the heating zone 111. In contrast, the apparatus 300 of FIG. 5 comprises a non-smokable thermally-conductive element 140 that extends around the heating zone 111. Therefore, whereas in the embodiment of FIG. 3 the heating zone 111 and any article therein in use is heated from the inside outwards, in the embodiment of FIG. 5 the heating zone 111 and any article therein in use is heated from the outside inwards.

The element 140 is a tubular non-smokable thermally-conductive element 140 that encircles the heating zone 111. However, in other embodiments, the element 140 may not be fully tubular. For example, in some embodiments, the element 140 may be tubular save for an axially-extending gap or slit formed in the element 140. The element 140 has a substantially circular cross-section. However, in other embodiments, the element 140 may have a cross-section other than circular, such as square, rectangular, polygonal or elliptical. The element 140 extends along a longitudinal axis that is substantially aligned with a longitudinal axis of the heating zone 111. In this embodiment, the aligned axes are coincident. In a variation to this embodiment, the aligned axes may be parallel to each other. However, in other embodiments, the axes may be oblique to each other.

In this embodiment, the heating zone 111 is defined at least in part by the element 140. That is, the element 140 at least partially delineates or delimits the heating zone 111. The cross-section of the heating zone 111 perpendicular to the longitudinal axis of the heating zone 111 is constant along the length of the heating zone 111, in this embodiment. However, in other embodiments, the cross-section may vary with distance along the length of the heating zone 111. In this embodiment the cross-section of the heating zone 111 is circular, but in other embodiments the cross-section of the heating zone 111 may be other than circular, such as square, rectangular, polygonal or elliptical.

When an article comprising smokable material is located in the heating zone 111, the element 140 is in thermal contact with the smokable material. In some embodiments, when an article comprising smokable material is located in the heating zone 111, the element 140 is in surface contact with the smokable material. Thus, heat may be conducted directly from the element 140 to the smokable material. In other embodiments, the element 140 may be kept out of direct surface contact with the smokable material. Examples of how this may be achieved are as discussed above.

Similarly to the element 140 of the embodiment of FIG. 4, the element 140 of the embodiment of FIG. 5 has a first portion 140a and a second portion 140b, wherein the first and second portions 140a, 140b of the element 140 have different respective thermal masses. In this embodiment, the material composition and density of the first portion 140a of the element 140 is the same as the material composition and density of the second portion 140b of the element 140. Moreover, in this embodiment, the material composition and density of the element 140 is homogenous throughout the element 140. The first and second portions 140a, 140b of the element 140 have different respective thermal masses as a result of a thickness of the first portion 140a of the element 140 being different to a thickness of the second portion 140b of the element 140. More specifically, the second portion 140b of the element 140 has a greater thermal mass than the first portion 140a of the element 140, as a result of the second portion 140b of the element 140 being thicker than the first portion 140a of the element 140.

Similarly to the embodiment of FIG. 4, the thermal mass increases continuously with distance along the length of the element 140 from the free first end of the element 140 to the second end of the element 140. More specifically, in this embodiment, the thermal mass increases linearly, or substantially linearly, with distance along the length. However, in other embodiments, the thermal mass may vary other than continuously with distance along the length of the element 140, similarly to as discussed above.

Similarly to above, in other embodiments, the first and second portions 140a, 140b of the element 140 may have different respective thermal masses as a result of an alternative characteristic, such as density or material composition, which varies between the first and second portions 140a, 140b.

The body of heating material 130 is embedded within only the first portion 140a of the element 140. The second portion 140b of the element 140 is free from heating material. Penetration of the body of heating material 130 with the varying magnetic field causes the first portion 140a of the element 140 to be heated at a relatively great rate. Over time, the temperature of the second portion 140b of the element 140 increases due to thermal conduction from the first portion 140a of the element 140. However, the rate of heating of the element 140 reduces with distance from the body of heating material 130, due to the increasing thermal mass with distance from the body of heating material 130.

Figure 8:
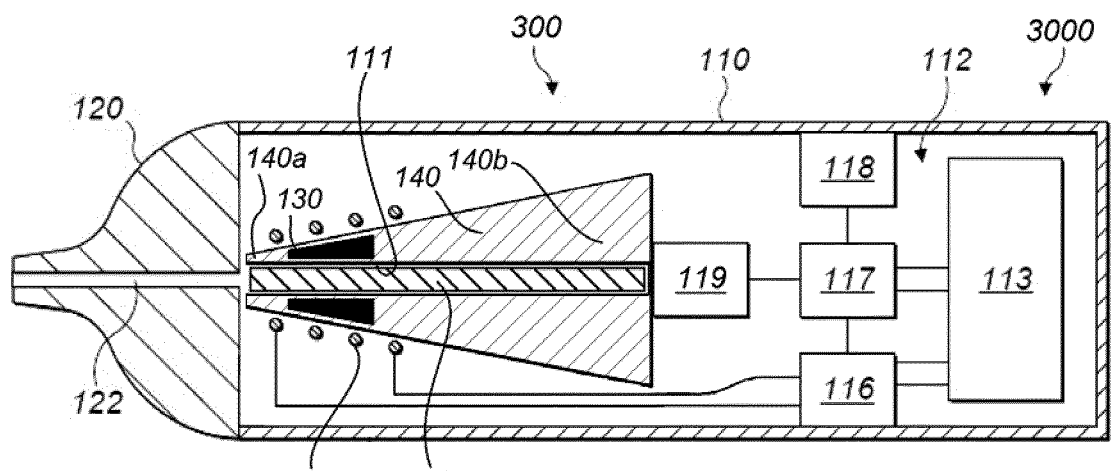
FIG. 8 shows a schematic cross-sectional view of an example of another system comprising an article comprising smokable material, and the apparatus of FIG. 5 for heating the smokable material to volatilize at least one component of the smokable material.

Accordingly, during penetration on the body of heating material 130 with the varying magnetic field generated by the generator 112, a similar progressive heating effect to that discussed above can be provided. That is, in use, when an article is located in the heating zone 111 (as shown in FIG. 8, discussed below), heat emanating from the first portion 140a of the element 140 heats smokable material in a first portion of the article that is relatively close to the body of heating material 130. Over time, the temperature of the second portion 140b of the element 140 relatively far from the body of heating material 130 increases due to thermal conduction from the first portion 140a of the element 140. This causes smokable material in a second portion of the article adjacent the second portion 140b of the element 140 to be heated by heat emanating from the second portion 140b of the element 140.

As for the embodiment of FIG. 4, in this embodiment the body of heating material 130 is located in the first portion 140a of the element 140, which is closer to the channel 122 of the mouthpiece 120 than the second portion 140b of the element 140. Therefore, in use the first portion of the article to be heated to volatilize component(s) of the smokable material is also closer to the channel 122 of the mouthpiece 120 than the second portion of the article. However, in other embodiments the body of heating material 130 may instead be arranged in the second portion 140b of the element 140.

In this embodiment, as noted above, the cross-section of the heating zone 111 perpendicular to the longitudinal axis of the heating zone 111 is constant along the length of the heating zone 111. Moreover, as also noted above, the thickness or diameter of the element 140 varies linearly with distance along the length of the element 140. Therefore, the element 140 is conical or frustoconical. It will be noted that the coil 114 of this embodiment extends along an axis that is substantially coincident with the longitudinal axis of the heating zone 111. The coil 114 has a diameter that varies with distance along the longitudinal axis of the heating zone 111 so that the coil is a conic helix. However, in other embodiments, the coil 114 may have a substantially constant diameter along its full length so that the coil 114 is a circular helix.

Referring to FIGS. 6, 7 and 8 there are shown schematic cross-sectional views of examples of systems according to respective embodiments of the disclosure. The system 1000 of FIG. 6 comprises the apparatus 100 of FIG. 3 and an article 2 comprising smokable material. The system 2000 of FIG. 7 comprises the apparatus 200 of FIG. 4 and an article 3 comprising smokable material. The system 3000 of FIG. 8 comprises the apparatus 300 of FIG. 5 and an article 4 comprising smokable material.

The heating zone 111 of each of the apparatuses 100, 200, 300 is for receiving the article 2, 3, 4 of the respective system 1000, 2000, 3000. In each of these embodiments, the article 2, 3, 4 is insertable into the heating zone 111 of the respective apparatus 100, 200, 300 when the mouthpiece 120 is disengaged from the body 110 of the respective apparatus 100, 200, 300. In each system 1000, 2000, 3000, operation of the magnetic field generator 112 generates a varying magnetic field that penetrates the body of heating material 130, as discussed above, to cause progressive heating of the element 140. In turn, the progressive heating of the element 140 causes progressive heating of the heating zone 111, and therefore the smokable material of the respective article 2, 3, 4, such as to volatilize at least one component of the smokable material without combusting the smokable material as also discussed above.

In the interest of conciseness, the apparatuses 100, 200, 300 will not be described again in detail. Any of the herein-described possible variations to the apparatuses 100, 200, 300 of FIGS. 3, 4 and 5 may be made to the apparatuses 100, 200, 300 of the systems 1000, 2000, 3000 of FIGS. 6, 7 and 8 to form separate respective embodiments of systems.

Figure 9:
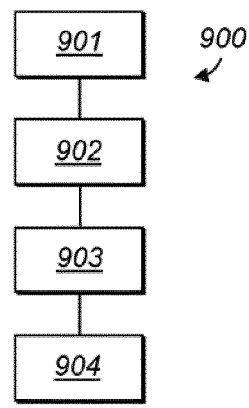
FIG. 9 shows a flow diagram showing an example of a method of heating smokable material to volatilize at least one component of the smokable material.

Referring to FIG. 9 there is shown a flow diagram showing an example of a method of heating smokable material to volatilize at least one component of the smokable material according to an embodiment of the disclosure.

The method 900 comprises providing 901 a body of heating material that is heatable by penetration with a varying magnetic field. The body of heating material could, for example, be a body of an apparatus for heating smokable material to volatilize at least one component of the smokable material, such as the bodies of heating material 130 discussed above with reference to FIGS. 3, 4 and 5. Alternatively, the body of heating material could, for example, be a body of heating material of an article comprising the smokable material, such as the body of heating material 10 discussed above with reference to FIGS. 1 and 2.

The method also comprises providing 902 a non-smokable thermally-conductive element in thermal contact with the body of heating material and arranged relative to the body of heating material so that heating of the heating material by penetration with the varying magnetic field causes progressive heating of the element. The body of heating material may be in surface contact with the non-smokable thermally-conductive element, such as affixed to, or embedded in, the element.

The method further comprises providing 903 smokable material in thermal contact with the element. The smokable material could be comprised in an article, such as that shown in FIGS. 1 and 2. The smokable material may be in thermal contact with the element as a result of the element also being part of the article, as is the case in FIG. 1. Alternatively, the smokable material may be placed in thermal contact with the element as a result of inserting smokable material into the heating zone of an apparatus comprising the element, as is the case in FIGS. 3, 4 and 5.

The method further comprises penetrating 904 the heating material with the varying magnetic field so as to cause progressive heating of the element, thereby to cause progressive heating of the smokable material. Examples of how this may be achieved are described above. The heating of the smokable material may be such as to volatilize at least one component of the smokable material without combusting the smokable material.

In each of the embodiments discussed above the heating material is steel. However, in other embodiments, the heating material may comprise one or more materials selected from the group consisting of: an electrically-conductive material, a magnetic material, and a magnetic electrically-conductive material. In some embodiments, the heating material may comprise a metal or a metal alloy. In some embodiments, the heating material may comprise one or more materials selected from the group consisting of: aluminum, gold, iron, nickel, cobalt, conductive carbon, graphite, plain-carbon steel, stainless steel, ferritic stainless steel, copper, and bronze. Other heating material(s) may be used in other embodiments. It has been found that, when magnetic electrically-conductive material is used as the heating material, magnetic coupling between the magnetic electrically-conductive material and an electromagnet of the apparatus in use may be enhanced. In addition to potentially enabling magnetic hysteresis heating, this can result in greater or improved Joule heating of the heating material, and thus greater or improved heating of the smokable material.

The heating material may have a skin depth, which is an exterior zone within which most of an induced electrical current and/or induced reorientation of magnetic dipoles occurs. By providing that the heating material has a relatively small thickness, a greater proportion of the heating material may be heatable by a given varying magnetic field, as compared to heating material having a depth or thickness that is relatively large as compared to the other dimensions of the heating material. Thus, a more efficient use of material is achieved and, in turn, costs are reduced.

In each of the embodiments discussed above the non-smokable thermally-conductive element is made from a non-magnetic, electrical insulator with high thermal conductivity. Examples of such materials are diamond and pyrolytic graphite sheet (if properly oriented). However, in respective variations to each of these embodiments, the element may comprise one or more other materials. In some embodiments, the element could be made from an electrically conductive material, such as copper, carbon or aluminum.

In each of the above described embodiments, the smokable material comprises tobacco. However, in respective variations to each of these embodiments, the smokable material may consist of tobacco, may consist substantially entirely of tobacco, may comprise tobacco and smokable material other than tobacco, may comprise smokable material other than tobacco, or may be free from tobacco. In some embodiments, the smokable material may comprise a vapor or aerosol forming agent or a humectant, such as glycerol, propylene glycol, triacetin, or diethylene glycol.

In each of the above described embodiments, the smokable material is non-liquid smokable material, and the apparatus is for heating non-liquid smokable material to volatilize at least one component of the smokable material. In other embodiments, the opposite may be true.

In each of the above described embodiments, the article 1, 2, 3, 4 is a consumable article. Once all, or substantially all, of the volatilizable component(s) of the smokable material 30 in the article 1, 2, 3, 4 has/have been spent, the user may remove the article 1, 2, 3, 4 from the apparatus 100, 200, 300 and dispose of the article 1, 2, 3, 4. The user may subsequently re-use the apparatus 100, 200, 300 with another of the articles 1, 2, 3, 4. However, in other respective embodiments, the article may be non-consumable, and the apparatus and the article may be disposed of together once the volatilizable component(s) of the smokable material has/have been spent.

In some embodiments, the apparatus 100, 200, 300 is sold, supplied or otherwise provided separately from the articles 1, 2, 3, 4 with which the apparatus 100, 200, 300 is usable. However, in some embodiments, the apparatus 100, 200, 300 and one or more of the articles 1, 2, 3, 4 may be provided together as a system, such as a kit or an assembly, possibly with additional components, such as cleaning utensils.

In order to address various issues and advance the art, the entirety of this disclosure shows by way of illustration and example various embodiments in which the claimed invention may be practiced and which provide for a superior apparatus for heating smokable material to volatilize at least one component of the smokable material, superior articles for use with such an apparatus, superior systems comprising such an apparatus and such articles, and superior methods of heating smokable material to volatilize at least one component of the smokable material. The advantages and features of the disclosure are of a representative sample of embodiments only, and are not exhaustive and/or exclusive. They are presented only to assist in understanding and teach the claimed and otherwise disclosed features. It is to be understood that advantages, embodiments, examples, functions, features, structures and/or other aspects of the disclosure are not to be considered limitations on the disclosure as defined by the claims or limitations on equivalents to the claims, and that other embodiments may be utilized and modifications may be made without departing from the scope and/or spirit of the disclosure. Various embodiments may suitably comprise, consist of, or consist in essence of, various combinations of the disclosed elements, components, features, parts, steps, means, etc. The disclosure may include other inventions not presently claimed, but which may be claimed in future.

The invention claimed is:

1. An article for use with an apparatus for heating smokable material to volatilize at least one component of the smokable material, the article comprising:
   a body of heating material that is heatable by penetration with a varying magnetic field;
   a non-smokable thermally-conductive element in thermal contact with the body of heating material and arranged relative to the body of heating material so that heating of the body of heating material causes progressive heating of the non-smokable thermally-conductive element; and
   smokable material in thermal contact with the non-smokable thermally-conductive element and arranged relative to the non-smokable thermally-conductive element so that the progressive heating causes progressive heating of the smokable material, and a cover circumscribing the smokable material, wherein the body of heating material, non-smokable thermally-conductive element and cover are individual components of the article.

2. The article of claim 1, wherein the non-smokable thermally-conductive element is in surface contact with the body of heating material.

3. The article of claim 1, wherein the smokable material is in surface contact with the non-smokable thermally-conductive element.

4. The article of claim 1, wherein the body of heating material is at least partially embedded in the non-smokable thermally-conductive element.

5. The article of claim 1, wherein the body of heating material is fully embedded in the non-smokable thermally-conductive element.

6. The article of claim 1, wherein the non-smokable thermally-conductive element extends along at least a majority of a length of the smokable material.

7. The article of claim 1, wherein the body of heating material is located at only a first end portion of the non-smokable thermally-conductive element; and
   wherein an opposite second end portion of the non-smokable thermally-conductive element is free from heating material that is heatable by penetration with a varying magnetic field.

8. The article of claim 1, wherein the body of heating material comprises a metal or a metal alloy.

9. The article of claim 1, wherein the smokable material comprises at least one of tobacco or one or more humectants.

10. The article of claim 9, further comprising a cover circumscribing the smokable material, wherein the smokable material comprises tobacco.

11. The article of claim 1, wherein the thermally conductive element is planar.

12. The article of claim 1, wherein the body of heating material has a substantially rectangular cross-section.

13. The article of claim 1, wherein the smokable material is non-liquid.

14. The article of claim 1, wherein the cover includes free ends configured to overlap and adhere to one another.

15. The article of claim 1, wherein a flow of air is configured to pass through the smokable material.

16. An apparatus for heating smokable material to volatilize at least one component of the smokable material, the apparatus comprising:
   a body;
   a magnetic field generator for generating a varying magnetic field;
   a body of heating material that is heatable by penetration with the varying magnetic field;
   a non-smokable thermally-conductive element comprising a free first end and a second end at which is the element is mounted to the body, the non-smokable thermally-conductive element in thermal contact with the body of heating material and arranged relative to the body of heating material so that heating of the body of heating material by penetration with the varying magnetic field causes progressive heating of the non-smokable thermally-conductive element; and
   a heating zone for receiving at least a portion of an article comprising smokable material, wherein the heating zone is in thermal contact with the non-smokable thermally-conductive element and is arranged relative to the non-smokable thermally-conductive element so that the progressive heating causes progressive heating of the heating zone,
   wherein the smokable material encircles the non-smokable thermally-conductive element along a full length of the non-smokable thermally-conductive element when the article comprising the smokable material is received in the heating zone.

17. The apparatus of claim 16, wherein the body of heating material is at least partially embedded in the non-smokable thermally-conductive element.

18. The apparatus of claim 16, wherein the body of heating material is fully embedded in the non-smokable thermally-conductive element.

19. The apparatus of claim 16, wherein the body of heating material is located at only a first end portion of the non-smokable thermally-conductive element; and wherein an opposite second end portion of the non-smokable thermally-conductive element is free from heating material that is heatable by penetration with a varying magnetic field.

20. The apparatus of claim 16, wherein the non-smokable thermally-conductive element projects into the heating zone.

21. The apparatus of claim 16, wherein the non-smokable thermally-conductive element extends at least partially around the heating zone.

22. The apparatus of claim 16, wherein the non-smokable thermally-conductive element extends along at least a majority of a length of the heating zone.

23. The apparatus of claim 16, wherein a first portion and a second portion of the non-smokable thermally-conductive element have different respective thermal masses.

24. The apparatus of claim 23, wherein the second portion of the non-smokable thermally-conductive element is thicker than the first portion of the non-smokable thermally-conductive element;

wherein the body of heating material is in surface contact with only the first portion of the non-smokable thermally-conductive element; and wherein the second portion of the non-smokable thermally-conductive element is free from heating material that is heatable by penetration with a varying magnetic field.

25. A system for heating smokable material to volatilize at least one component of the smokable material, the system comprising:

an article comprising smokable material;
and an apparatus comprising:
a body;
a magnetic field generator for generating a varying magnetic field,
a body of heating material that is heatable by penetration with the varying magnetic field,
a non-smokable thermally-conductive element comprising a free first end and a second end at which the element is mounted to the body, the non-smokable thermally-conductive element in thermal contact with the body of heating material and arranged relative to the body of heating material so that heating of the body of heating material by penetration with the varying magnetic field causes progressive heating of the non-smokable thermally-conductive element, and
a heating zone for receiving at least a portion of the article, wherein the heating zone is in thermal contact with the non-smokable thermally-conductive element and is arranged relative to the non-smokable thermally-conductive element so that the progressive heating causes progressive heating of the heating zone,
wherein the smokable material encircles the non-smokable thermally-conductive element along a full length of the non-smokable thermally-conductive element when the article comprising the smokable material is received in the heating zone.

26. A method of heating smokable material to volatilize at least one component of the smokable material, the method comprising:

providing a body of heating material that is heatable by penetration with a varying magnetic field;
providing a non-smokable thermally-conductive element in thermal contact with the body of heating material and arranged relative to the body of heating material so that heating of the body of heating material by penetration with the varying magnetic field causes progressive heating of the non-smokable thermally-conductive element;
providing smokable material wherein the non-smokable thermally-conductive element is embedded within the smokable material such that the smokable material is in thermal contact with the non-smokable thermally-conductive element;
providing a cover circumscribing the smokable material; and
penetrating the heating material with the varying magnetic field so as to cause progressive heating of the non-smokable thermally-conductive element, thereby to cause progressive heating of the smokable material,
wherein the smokable material encircles the non-smokable thermally-conductive element along a full length of the non-smokable thermally-conductive element when the article comprising the smokable material is received in the heating zone, and
wherein the body of heating material, the non-smokable thermally-conductive heating element and the cover are individual components of an article.

27. A method of heating smokable material to volatilize at least one component of the smokable material, the method comprising:

providing a body of heating material that is heatable by penetration with a varying magnetic field;
providing a non-smokable thermally-conductive element comprising a free first end and a second end at which the element is mounted to a body of an apparatus, the non-smokable thermally-conductive element in thermal contact with the body of heating material and arranged relative to the body of heating material so that heating of the body of heating material by penetration with the varying magnetic field causes progressive heating of the non-smokable thermally-conductive element;
providing smokable material wherein the non-smokable thermally-conductive element is embedded within the smokable material such that the smokable material is in thermal contact with the non-smokable thermally-conductive element; and
penetrating the heating material with the varying magnetic field so as to cause progressive heating of the non-smokable thermally-conductive element, thereby to cause progressive heating of the smokable material,
wherein the smokable material encircles the non-smokable thermally-conductive element along a full length of the non-smokable thermally-conductive element when the article comprising the smokable material is received in the heating zone.

* * * * *